United States Patent
Hakeem et al.

(10) Patent No.: US 10,843,971 B2
(45) Date of Patent: *Nov. 24, 2020

(54) CBN COMPOSITE FORMATION METHOD INCLUDING CONSOLIDATION

(71) Applicant: KING FAHD UNIVERSITY OF PETROLEUM AND MINERALS, Dhahran (SA)

(72) Inventors: Abbas Saeed Hakeem, Dhahran (SA); Tahar Laoui, Dhahran (SA); Hafiz Muzammil Irshad, Dhahran (SA); Bilal Anjum Ahmed, Dhahran (SA); Muhammad Ali Ehsan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,122

(22) Filed: Jul. 10, 2019

(65) Prior Publication Data
US 2019/0330117 A1    Oct. 31, 2019

Related U.S. Application Data

(63) Continuation of application No. 15/788,914, filed on Oct. 20, 2017, now Pat. No. 10,377,671.

(51) Int. Cl.
C04B 35/117 (2006.01)
C04B 35/103 (2006.01)
(Continued)

(52) U.S. Cl.
CPC .......... *C04B 35/117* (2013.01); *C04B 35/103* (2013.01); *C04B 35/62842* (2013.01);
(Continued)

(58) Field of Classification Search
CPC . B23B 27/148; C04B 35/488; C04B 35/5831; C04B 35/6261; C04B 35/62842;
(Continued)

(56) References Cited

U.S. PATENT DOCUMENTS 9,327,352 B2 ‡  5/2016  Fukushima ............. C04B 41/87

FOREIGN PATENT DOCUMENTS

CN    103121845 A  ‡  5/2013  ............. C04B 35/64
CN    104987073 A  ‡  10/2015  ........... C04B 35/532
(Continued)

OTHER PUBLICATIONS

Klimczyk et al. Al2O3-cBN composites sintered by SPS and HPHT methods. Journal of the European Ceramic Society vol. 36, Issue 7, Jun. 2016, pp. 1783-1789.*

(Continued)

*Primary Examiner* — Noah S Wiese
(74) *Attorney, Agent, or Firm* — Oblon, McClelland, Maier & Neustadt, L.L.P.

(57) ABSTRACT

Conventional sintering processes convert a portion of cBN to hBN which is softer than cBN which negatively affects functional properties of an alumina composite. The invention is directed to method for making an alumina-cubic boron nitride ($Al_2O_3$-cBN) composite that contains substantially no hexagonal boron nitride (hBN) by non-conventional spark plasma sintering of cBN with nano-sized alumina particles. The invention is also directed to $Al_2O_3$-cBN/Ni composites, which contain substantially no hBN, and which exhibit superior physical and mechanical properties compared to alumina composites containing higher amounts of hBN.

14 Claims, 16 Drawing Sheets

(51) Int. Cl.
  *C04B 35/64* (2006.01)
  *C04B 35/628* (2006.01)
  *C22C 29/12* (2006.01)
  *C22C 29/00* (2006.01)
  *C22C 26/00* (2006.01)

(52) U.S. Cl.
  CPC .............. *C04B 35/64* (2013.01); *C22C 29/00* (2013.01); *C22C 29/12* (2013.01); *C04B 2235/3217* (2013.01); *C04B 2235/386* (2013.01); *C04B 2235/405* (2013.01); *C04B 2235/5436* (2013.01); *C04B 2235/5445* (2013.01); *C04B 2235/5454* (2013.01); *C04B 2235/6562* (2013.01); *C04B 2235/666* (2013.01); *C04B 2235/96* (2013.01); *C04B 2235/9607* (2013.01); *C22C 2026/003* (2013.01)

(58) Field of Classification Search
  CPC ........ C04B 35/62884; C04B 35/62897; C04B 35/6303; C04B 35/645; B82Y 30/00
  See application file for complete search history.

(56) References Cited

FOREIGN PATENT DOCUMENTS

| | | | | |
|---|---|---|---|---|
| CN | 105950940 A | ‡ | 9/2016 | ............ C23C 29/16 |
| CN | 106544612 A | ‡ | 3/2017 | ............... C23C 4/06 |
| EP | 2 342 033 B1 | ‡ | 8/2016 | ............ B23B 27/00 |
| WO | 2007/113643 A2 | | 10/2007 | |
| WO | 20071113643 A2 | ‡ | 10/2007 | ............ B24D 18/00 |

OTHER PUBLICATIONS

Zhang et al. Spark plasma sintering of Al2O3-cBN composites facilitated by Ni nanoparticle precipitation on cBN powder by rotary chemical vapor deposition. Journal of the European Ceramic Society vol. 31, Issue 12, Oct. 15, 2011, pp. 2083-2087.*

Klimczyk et al. Al2O3-cBN composites sintered by SPS and HPHT methods. Journal of the European Ceramic Society 36 (2016) 1783-1789.‡

Zhang et al. Spark plasma sintering of Al2O3-cBN composites facilitated by Ni nanoparticle precipitation on cBN powder by rotary chemical vapor deposition. Journal of the European Ceramic Society 31 (2011) 2083-2087.‡

Zhang et al. Spark plasma sintering of Al2O3-cBN composites facilitated by Ni nanoparticie precipitation on cBN powder by rotary chemical vapor deposition. Journal of the European Ceramic Society 31 (2011) 2083-2087.

Hakeem, A.S., et al., "Effect of Nano/Micro Alumina Matrix on Alumina-Cubic Boron Nitride Composites Consolidated by Spark Plasma Sintering", URL: https://www.waset.org/abstracts/67800, World Academy of Science, Engineering and Technology, International Science Index, Materials and Metallurgical Engineering, vol. 4, No. 7, 1 Page total, (2017) (Abstract only).

Shonhiwa, A. T., "Alumina-Cubic Boron Nitride Composite Materials", URL: http://wiredspace.wits.ac.za/handle/10539/5028, WITS Institutional Repository Environment on Dspace, 1 Page total, (Jul. 10, 2008) (Abstract only).

\* cited by examiner
‡ imported from a related application

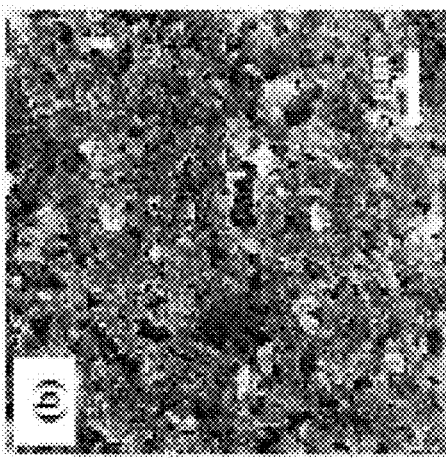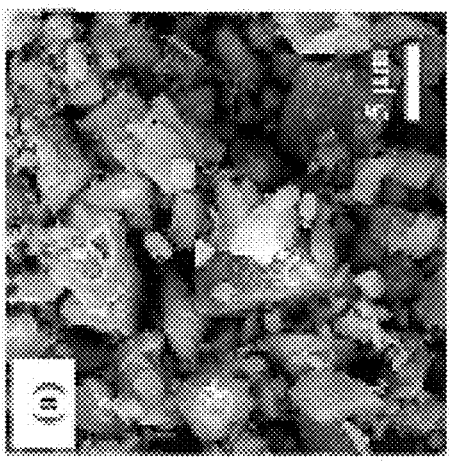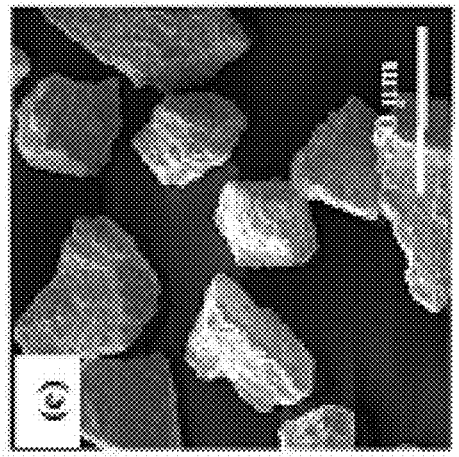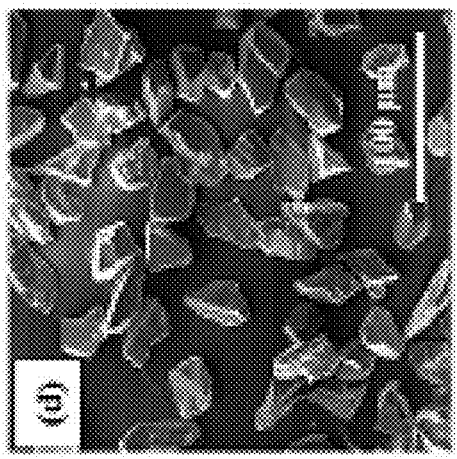

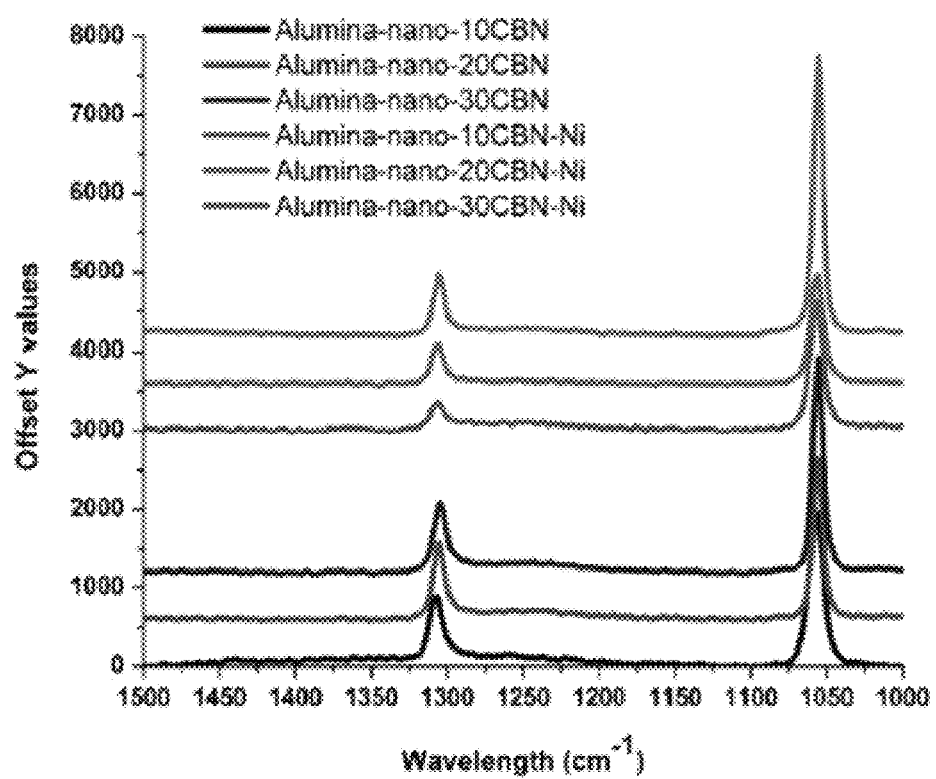

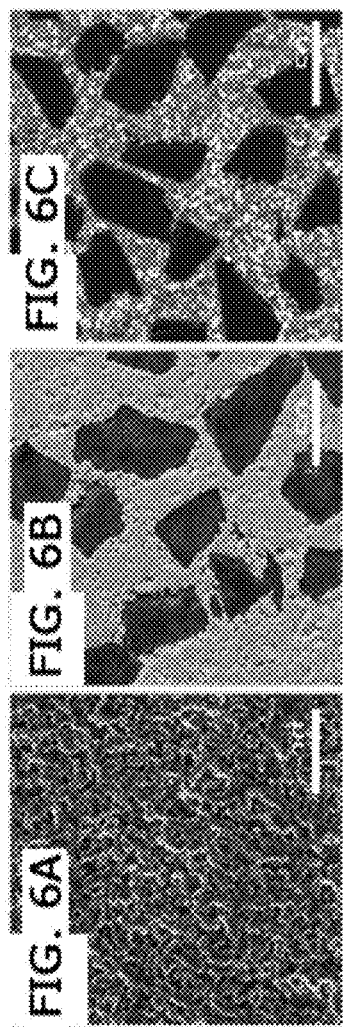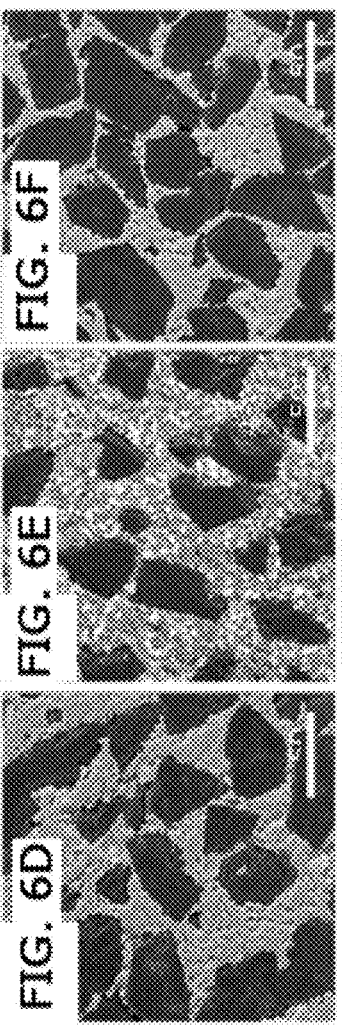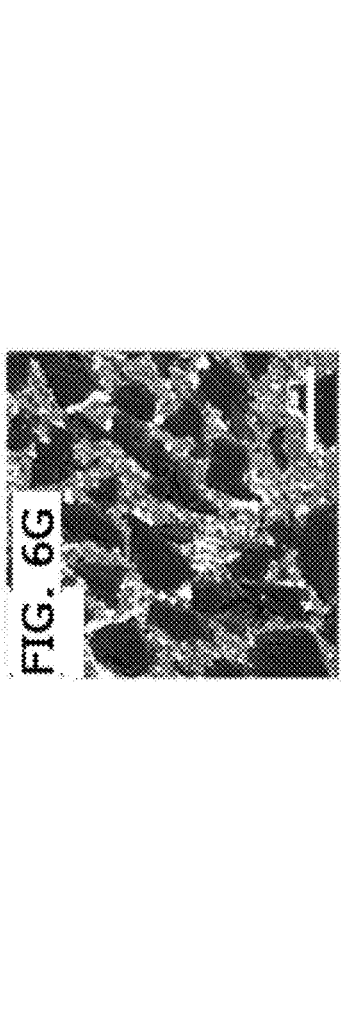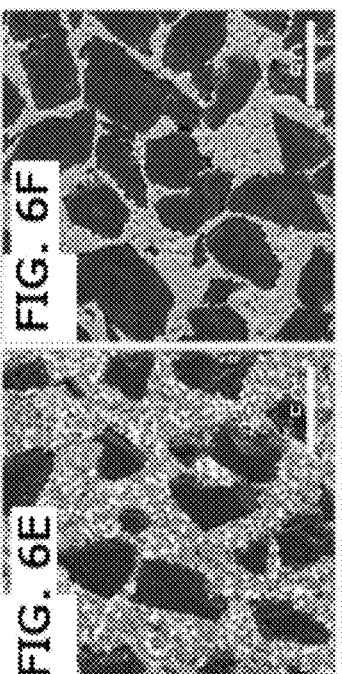

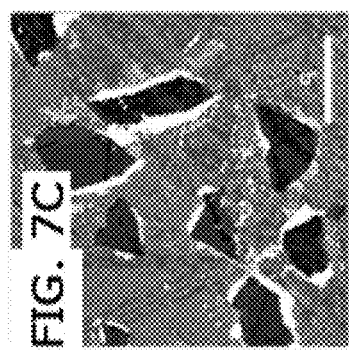
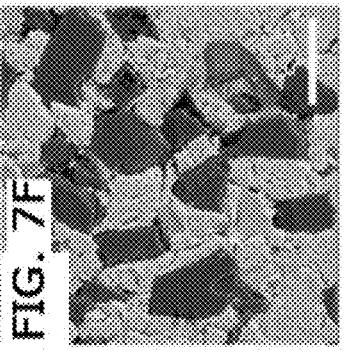
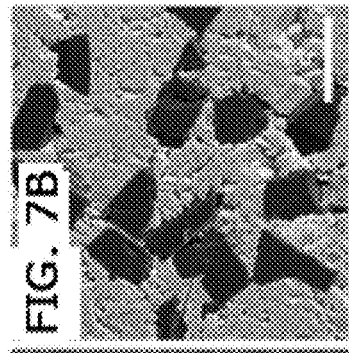
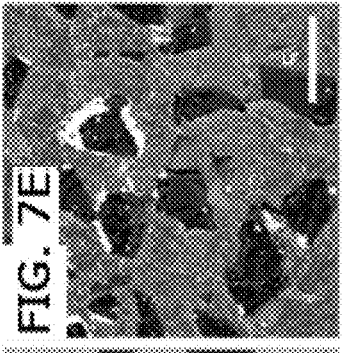
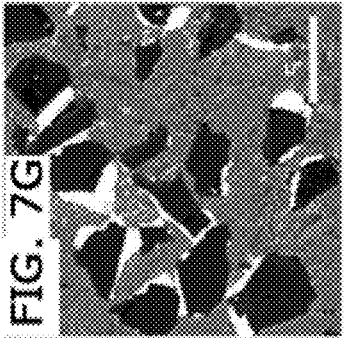
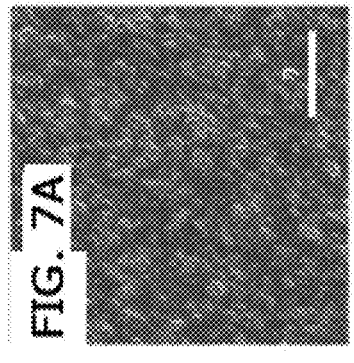
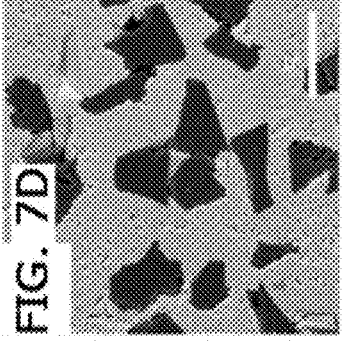

CBN COMPOSITE FORMATION METHOD INCLUDING CONSOLIDATION

CROSS-REFERENCE TO RELATED APPLICATIONS

The present application is a Continuation of Ser. No. 15/788,914, now allowed, having a filing date of Oct. 20, 2017.

STATEMENT REGARDING PRIOR DISCLOSURES BY THE INVENTOR OR A JOINT INVENTOR

Irshad, et al., *Investigation of the structural and mechanical properties of micro-/nano-sized $Al_2O_3$ and cBN composites prepared by spark plasma sintering*. Ceramics International, Volume 43, Issue 14, 1 Oct. 2017, Pages 10645-10653, (available online 27 May 2017).

BACKGROUND

Field of the Invention

A method for making an alumina-cubic boron nitride ($Al_2O_3$-cBN) composite that contains substantially no hexagonal boron nitride (hBN) by spark plasma sintering nickel-coated cBN particles with nano-sized alumina particles. This method avoids many drawbacks of conventional sintering processes which convert a portion of cBN to hBN which is softer than cBN and can negatively impact the properties of the resulting composite. An $Al_2O_3$-cBN/Ni composite having superior physical and mechanical properties that contains cBN, but substantially no hBN.

Description of Related Art

The "background" description provided herein is for the purpose of generally presenting the context of the disclosure. Work of members of the presently named inventive entity, to the extent that it is described in this background section, as well as aspects of the description which may not otherwise qualify as prior art at the time of filing, are neither expressly or impliedly admitted as prior art against the present invention.

Ceramic materials such as alumina, cBN and TiN are widely used in engineering applications because of their high hardness, wear resistance, and high strength. For instance, these kinds of ceramic materials are used in the field of aerospace and for high-speed machining and milling as well as use to make cutting tools or vehicular parts.

Aluminum oxide ($Al_2O_3$), commonly known as alumina, is one of the most widely used raw materials for producing ceramic materials for high-temperature applications. Alumina compounds occur abundantly in nature most often as impure hydroxides and are found in a diverse number of types having a wide range of properties.

Cubic boron nitride (cBN) is also a material used to produce ceramic composites but does not exist in a natural form. Cubic boron nitride is structurally comparable to diamond in hardness and has other similar or even superior properties to those of diamond for many applications, for example, cBN is thermodynamically stable at temperatures up to 1,200° C. and at high pressure and has excellent thermal conductivity; P. Klimczyk, P. Figiel, I. Petrusha, A. Olszyna, *Cubic boron nitride based composites for cutting applications*, Journal of Achievements in Materials and Manufacturing Engineering, 44 (2011) 198-204 (incorporated by reference). Cubic boron nitride is seldom densified by conventional sintering because this transforms the harder cBN form into a more stable and softer hexagonal form, hBN; P. Klimczyk, E. Benko, K. Lawniczak-Jablonska, E. Piskorska, M. Heinonen, A. Ormaniec, W. Gorczynska-Zawislan, V. Urbanovich, *Cubic boron nitride-Ti/TiN composites: hardness and phase equilibrium as function of temperature*, Journal of alloys and Compounds, 382 (2004) 195-205; X.-Z. Rong, T. Tsurumi, O. Fukunaga, T. Yano, *High-pressure sintering of cBN-TiN-Al composite for cutting tool application*, Diamond and Related Materials, 11 (2002) 280-286; X.-Z. Rong, T. Yano, TEM investigation of high-pressure reaction-sintered cBN-Al composites, Journal of materials science, 39 (2004) 4705-4710 (each incorporated by reference).

Alumina ceramics, produced by non-conventional sintering techniques like Hot Pressing (HP) and Hot Isostatic Pressing (HIP), exhibit many important functional properties such as good mechanical strength, chemical stability, high thermal stability, and wear resistance; however, their natural brittleness limits their use; C. Xu, C. Huang, X. Ai, *Toughening and strengthening of advanced ceramics with rare earth additives*, Ceramics international, 32 (2006) 423-429 (incorporated by reference). Consequently, many attempts have been made to find new ways to produce alumina ceramics that are harder, less brittle, and which have other superior physical, chemical, and mechanical properties.

For any cutting material, suitable hardness, toughness and thermal conductivity are important, if not essential, properties; P. Klimczyk, M. Cura, A. Vlaicu, I. Mercioniu, P. Wyżga, L. Jaworska, S.-P. Hannula, *$Al_2O_3$-cBN composites sintered by SPS and HPHT methods*, Journal of the European Ceramic Society, 36 (2016) 1783-1789 (incorporated by reference). A cutting tool needs to be harder than the workpiece in order to withstand the wear action taking place and advantageously has properties that conduct away heat generated during cutting. In addition, a cutting tool needs to be sufficiently tough and non-brittle so that it can withstand any interruptions or vibrations occurring during a machining process.

The inclusion of second phase particles like nitrides, carbides, or zirconia, etc., can improve the mechanical properties of an alumina ceramic; A. Shonhiwa, M. Herrmann, I. Sigalas, N. Coville, Reaction bonded aluminum oxide composites containing cubic boron nitride, Ceramics International, 35 (2009) 909-911 (incorporated by reference). For instance, to improve the flexure strength and toughness of some alumina matrices SiC particles with a range of particle sizes may be added. Similarly, in some cases, fracture toughness and strength can be improved by reducing the matrix particle size; Y. Dong, F. Xu, X. Shi, C. Zhang, Z. Zhang, J. Yang, Y. Tan, *Fabrication and mechanical properties of nano-/micro-sized $Al_2O_3$/SiC composites*, Materials Science and Engineering: A, 504 (2009) 49-54 (incorporated by reference). Much effort has been expended during the last two decades to improve the toughness and strength of ceramic materials including adding $TiB_2$ particles to an alumina matrix to improve fracture toughness and hardness and improve wear and fracture behavior; D. Jianxin, A. Xing, *Wear resistance of $Al_2O_3$/$TiB_2$ ceramic cutting tools in sliding wear tests and in machining processes*, Journal of Materials Processing Technology, 72 (1997) 249-255 (incorporated by reference). Similarly, mechanical properties such as wear resistance, cutting ability, hardness, transverse rupture strength and indentation resistance may be improved by the addition of 20 mass % zirconia to an alumina ceramic; B. Smuk, M. Szutkowska, J. Walter, *Alumina ceramics with partially stabilized zirconia for cutting tools*, Journal of materials processing technology, 133 (2003) 195-198 (incorporated by reference).

The bending strength of an alumina ceramic may be enhanced by about 10% by the addition of one weight percent of multi-walled nanotubes; J. Sun, L. Gao, X. Jin, *Reinforcement of alumina matrix with multi-walled carbon nanotubes*, Ceramics international, 31 (2005) 893-896 (incorporated by reference). Recently, for engineering applications, graphene nanofillers have been used in alumina ceramics to reduce weight, increase strength and improve fracture toughness; J. Liu, H. Yan, K. Jiang, *Mechanical properties of graphene platelet-reinforced alumina ceramic composites*, Ceramics International, 39 (2013) 6215-6221 (incorporated by reference). Another method to reinforce structural ceramics is the incorporation of boron nitride nanotubes; W.-L. Wang, J.-Q. Bi, S.-R. Wang, K.-N. Sun, M. Du, N.-N. Long, Y.-J. Bai, *Microstructure and mechanical properties of alumina ceramics reinforced by boron nitride nanotubes*, Journal of the European Ceramic Society, 31 (2011) 2277-2284 (incorporated by reference).

While cubic boron nitride is the hardest material after diamond and has a good thermal conductivity, its other properties have discouraged its use in alumina ceramics. cBN is difficult to sinter by conventional methods. Furthermore, cBN transforms to softer phase hBN at higher temperatures, which leads to expansion in volume, porosity, low hardness and cracking of a composite. Furthermore, when incorporated into an alumina-cBN composite the transformation to softer phase is more accelerated as compared to that in a cBN body.

Sintering temperatures below about 1,400° C. have been employed to minimize the transition of cBN to hBN. By sintering an alumina and cBN mixture containing 10 and 20 wt % of cBN at 1,300° C. a composite having a relative density of more than 98% and a hardness of 26 GPa in alumina-cBN ceramics could be attained without phase transformation. Whereas by sintering above 1,400° C. formed a porous microstructure; M. Hotta, T. Goto, *Densification and microstructure of Al2O3-cBN composites prepared by spark plasma sintering*, Journal of the Ceramic Society of Japan, 116 (2008) 744-748; M. Hotta, T. Goto, *Effects of cubic BN addition and phase transformation on hardness of $Al_2O_3$-cubic BN composites*, Ceramics International, 37 (2011) 1453-1457 (both incorporated by reference).

Incorporation of nickel nanoparticles into an alumina composite has been used to improve densification and retain hardness. A composite sintered from nickel, alumina and 30 wt % cBN at 1,300° produced a composite having a relative density of about 99% and a hardness of 27 GPA was obtained. Similarly, the addition of other metals like Al or Ni into the $Al_2O_3$-cBN system can improve interface bonding strength, which results in the improvement in hardness; J. Zhang, R. Tu, T. Goto, *Spark plasma sintering of $Al_2O_3$-cBN composites facilitated by Ni nanoparticle precipitation on cBN powder by rotary chemical vapor deposition*, Journal of the European Ceramic Society, 31 (2011) 2083-2087 (incorporated by reference). ZHANG, et al. describe "Spark plasma sintering of $Al_2O_3$-cBN composites facilitated by Ni nanoparticle precipitation on cBN powder by rotary chemical vapor deposition".

In view of the challenges described above, the inventors sought to develop a new method to produce an $Al_2O_3$-cBN/Ni composite having superior chemical, physical, and mechanical properties. This new method uses spark plasma sintering to sinter nano-sized alumina particles and nickel-coated cBN particles. As shown by the comparative data herein, this new method efficiently produces alumina-cBN/Ni composites containing little or no hBN and which provides a composite with superior physical properties compared to those made with conventional sintering methods or by methods using larger micro-sized alumina particles.

BRIEF SUMMARY OF THE INVENTION

The invention is directed to a method for making an alumina-cubic boron nitride-nickel ($Al_2O_3$-cBN/Ni) composite by spark plasma sintering of nickel-coated cBN with nano-sized alumina particles and to an $Al_2O_3$-cBN/Ni composite that contains cBN, but contains substantially no hBN, and which exhibits superior chemical, physical and mechanical properties to otherwise identical composites made using conventional sintering, made with microsized alumina particles, or made without nickel-coated cBN particles.

BRIEF DESCRIPTION OF THE DRAWINGS

FIGS. 1A-1F. FIGS. 1A and 1B show FESEM micrographs of as-received micro/nano-sized alumina powders. FIG. 1C: their corresponding XRD spectra. FIGS. 1D and 1E: FESEM of cBN and Ni-coated cBN and FIG. 1F: their corresponding XRD spectra.

FIG. 2A shows XRD patterns for Sample #1-7 described in Table 1 which were made with micro-sized alumina. FIG. 2B shows XRD patterns for Sample #8-14 described in Table 1 which were made with nano-sized alumina with varying content of uncoated or nickel-coated cBN.

FIGS. 3A-3C. FIG. 3A. Raman Spectrum of nano-sized alumina reinforced with 10-30 wt. % of cBN particles with and without nickel coating. Legend refers to plots from bottom (Alumina-nano-10CBN) to top (Alumina-nano-30CBN-Ni). FIG. 3B. Raman Spectrum of micro-sized alumina reinforced with 10-30 wt. % of cBN particles without nickel coating. Legend refers to plots from bottom (Micron10CBN-Ni) to top (Micron30CBN-Ni). FIG. 3C. Raman Spectrum of micro-sized alumina reinforced with 10-30 wt. % of nickel-coated cBN particles. Legend refers to plots from bottom (Alumina-nano-10CBN) to top (Alumina-nano-30CBN).

FIG. 4B depicts a 3D line spectrum using Raman microscopy of alumina-Nano-30% cBN shown by FIG. 4A. FIG. 4D depicts a 3D line spectrum using Raman microscopy of alumina-Nano-30% cBN-Ni shown by FIG. 4C.

FIG. 5B depicts a 3D line spectrum using Raman microscopy of alumina-Micron-30% cBN-Ni shown by FIG. 5A. FIG. 5D depicts a 3D line spectrum using Raman microscopy of alumina-Micron-30% cBN shown by FIG. 5C.

FIGS. 6A-6G. FESEM micrographs of micro-sized particle alumina matrix compositions. FIG. 6A depicts a composite made with pure micro-sized $Al_2O_3$. FIG. 6B depicts a composite containing 10% cBN. FIG. 6C depicts a composite containing 10% cBN-Ni. FIG. 6D depicts a composite containing 20% cBN. FIG. 6E depicts a composite containing 20% cBN-Ni. FIG. 6F depicts a composite containing 30% cBN and FIG. 6G depicts a composite containing 30% cBN-Ni.

FIGS. 7A-7G. FESEM micrographs of micro-sized particle alumina matrix compositions. FIG. 7A depicts a composite made with pure micro-sized $Al_2O_3$. FIG. 7B depicts a composite containing 10% cBN. FIG. 7C depicts a composite containing 10% cBN-Ni. FIG. 6D depicts a composite containing 20% cBN. FIG. 7E depicts a composite containing 20% cBN-Ni. FIG. 7F depicts a composite containing 30% cBN and FIG. 7G depicts a composite containing 30% cBN-Ni.

FIG. 8A depicts a composite made by SPS micro-sized alumina with cBN and FIG. 8B depicts a composite made by SPS micro-sized alumina with cBN and nickel. FIG. 8C depicts a composite made by SPS nano-sized alumina with cBN and FIG. 8D depicts a composite made by SPS nano-sized alumina with cBN that has a nickel coating.

FIGS. 9A, 9B and 9C respectively show effects of 13 nm, 50 nm and 1 μm alumina particles.

DETAILED DESCRIPTION OF THE INVENTION

New alumina-cubic boron nitride composites containing substantially no boron nitride that is in a soft hexagonal form (hBN) have been developed. These composites have superior functional properties compared to composites made using conventional sintering processes which contain a higher content of a softer form of boron nitride, hBN.

Alumina—In most embodiments alpha-alumina, aluminum(III) oxide, or $Al_2O_3$ particles, are used as matrix components of the alumina-cBN or alumina-cBN/Ni composite. These particles may be microsized or nanosized alumina particles. Preferably, highly purified alumina is used to make the composites of the invention. The alumina content of a composite according to the invention typically ranges from 50 to <100 wt % of the unsintered starting materials for example, 50, 55, 60, 65, 70, 75, 80, 85, 90, 95, 99 or <100 wt % of the total starting materials to be sintered or any intermediate value of subrange.

Figure 11:
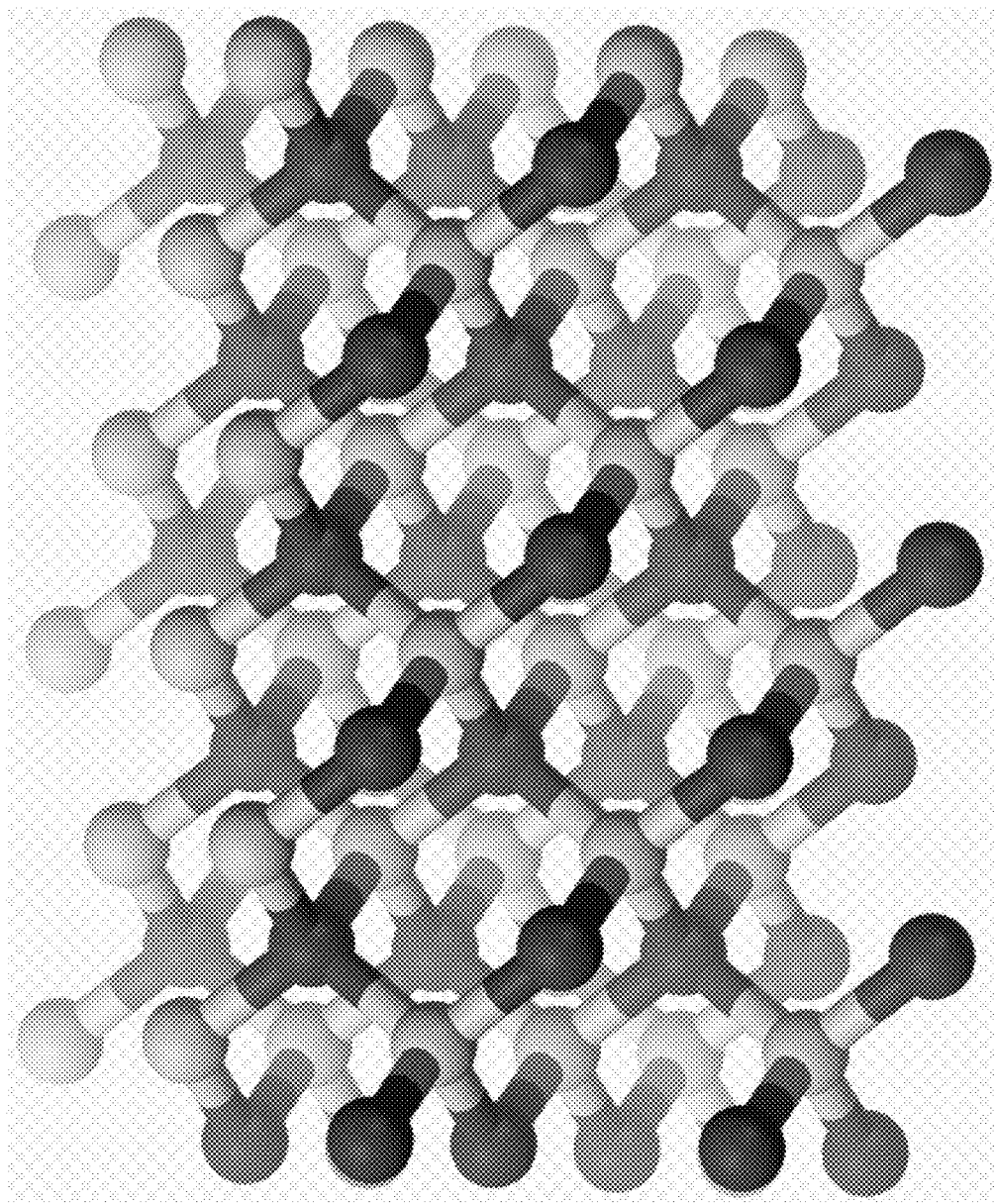
FIG. 11 depicts the structure of cubic boron nitride, cBN.
Figure 12:
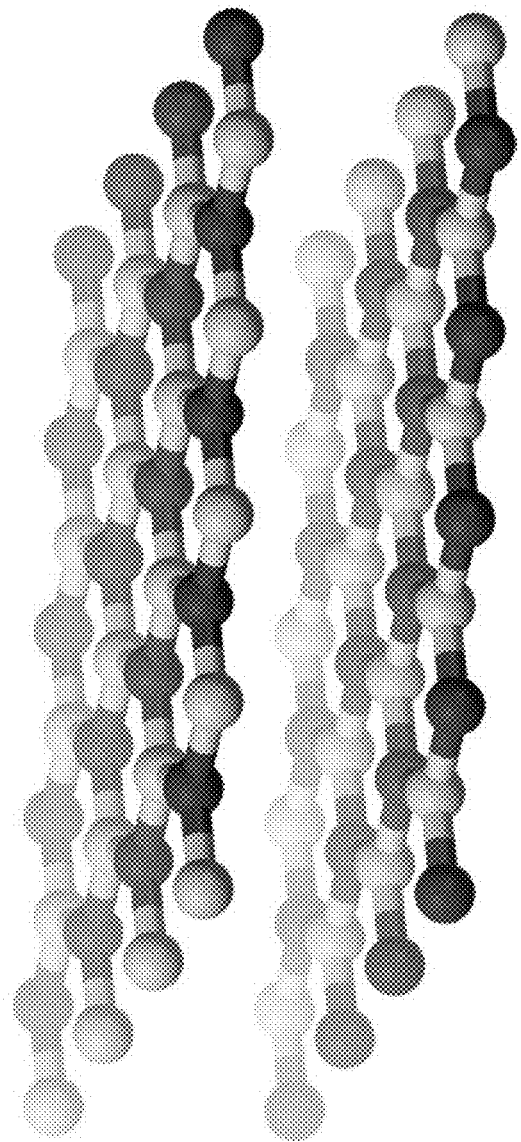
FIG. 12 depicts the structure of hexagonal boron nitride, hBN.

BN—boron nitride. Boron nitride occurs in a variety of forms, including as amorphous boron nitride, cubic boron nitride (cBN), hexagonal boron nitride (hBN), or as rhombohedral (rBN) or Wurtzeit (wBN) boron nitride allotropes. Boron nitride may also be in the form of nanotubes of substantially pure boron nitride, Chopra, Science; Washington 269.5226 (Aug. 18, 1995): 966 (incorporated by reference).

cBN has a cubic or sphalerite structure analogous to that of diamond and is illustrated by FIG. 11. Cubic Boron Nitride (cBN) is second in hardness only to diamond. It exhibits a high abrasion resistance and thermal conductivity when compared to conventional abrasives such as silicon carbide and aluminum oxide. The cBN content of a composite according to the invention typically ranges from about 2.5 to 50 wt % of the unsintered starting materials for example about 2.5, 5, 10, 15, 20, 25, 30, 35, 40, 45, or 50 wt % of the total starting materials to be sintered or any intermediate value of subrange.

Content of cBN and other allotropes such as hBN may be determined by methods known in the art including by XRD. cBN content described herein is determined by XRD or Raman spectroscopy. One representative method is described by and incorporated by reference to Schreiner W. N. (1995), *A standard test method for the determination of RIR values by X-ray diffraction*. Powder Diff 10, 25-33.

In some embodiments of the composite of the invention, more than 95, 96, 97, 98, 99, 99.5, 99.9, 99.95 or 99.99 w % of the BN will be in the form of cBN. This range includes all intermediate values and subranges.

Nickel-coated cBN describes cubic boron nitride coated with nickel. Preferably nickel content is sufficient to minimize or prevent conversion of cBN to hBN during sintering of an alumina-cBN/Ni composite. The content of Ni may vary, for example, it may range from 0.01 to 80 wt % of the nickel-coated cBN. This range includes all intermediate values and subranges such as about 0.01, 0.05, 0.1, 0.5, 1, 2, 5, 10, 15, 20, 25, 30, 35, 40, 45, 50, 55, 60, 65, 70, 75 and 80 wt %.

The nickel-cBN content of a composite according to the invention typically ranges from about 2.55 to 50 wt % of the unsintered starting materials for example about 2.5, 5, 10, 15, 20, 25, 30, 35, 40, 45, or 50 wt % of the total starting materials to be sintered or any intermediate value of subrange.

hBN is a hexagonal form of boron nitride analogous to graphite and is illustrated in FIG. 11. Conversion of cBN to hBN in a material lowers hardness, expands volume, increases porosity, and promotes cracking of a composite. In some embodiments of a composite of the invention, less than 0.001, 0.005, 0.01, 0.05, 0.1, 0.5, 1.0, 2.0, 3.0, 4.0 or 5.0 wt % of the total content of BN will be in the form of hBN. This range includes all intermediate values and subranges.

Other components. In some embodiments, an alumina-cBN or alumina-cBN/Ni composite of the invention may contain other ingredients such as $Si_3N_4$, SiC, $ZrO_2$ or nanotubes such as carbon or boron nitride nanotubes.

"Composite" refers to a material, such as an alumina-cBN material produced by sintering. A composite may contain a "matrix" of sintered alumina particles in which other materials, such as boron nitride or nickel are embedded as shown by FIG. 8A-8D.

Mixing/Homogenization. In most embodiments the starting materials for production of a composite, such as $Al_2O_3$-cBN or $Al_2O_3$-cBN/Ni of the invention are in the form of particles that are mixed prior to spark plasma sintering. In some embodiments, the starting materials will be homogenized, for example, by use of an ultrasonic sonicator probe, optionally followed by drying and further mixing using a mortar and pestle to provide a substantially uniform distribution of cBN or nickel-coated cBN particles in a matrix.

Spark Plasma Sintering ("SPS"). SPS is a process whereby a material in the form of a powder is subjected to heat by applying high direct current in combination with uniaxial pressure. It can result in particles bonding together to form a coherent body with reduced porosity, increased density and improved hardness, toughness and strength; B.-N. Kim, K. Hiraga, K. Morita, H. Yoshida, *Spark plasma sintering of transparent alumina*, Scripta Materialia, 57 (2007) 607-610; Z. Munir, U. Anselmi-Tamburini, M. Ohyanagi, *The effect of electric field and pressure on the synthesis and consolidation of materials: a review of the spark*

*plasma sintering method*, Journal of Materials Science, 41 (2006) 763-777; Z. Shen, M. Johnsson, Z. Zhao, M. Nygren, *Spark plasma sintering of alumina*, Journal of the American Ceramic Society, 85 (2002) 1921-1927; G.-D. Zhan, J. Kuntz, J. Wan, J. Garay, A. K. Mukherjee, *Alumina-based nanocomposites consolidated by spark plasma sintering*, Scripta Materialia, 47 (2002) 737-741 (each incorporated by reference). SPS has short sintering time; M. Nygren, Z. Shen, *On the preparation of bio-, nano- and structural ceramics and composites by spark plasma sintering*, Solid State Sciences, 5 (2003) 125-131 (incorporated by reference).

Transformation of cBN into hBN after spark plasma sintering has been reported; P. Klimczyka, M. E. Curab, A. M. Vlaicuc, I. Mercioniuc, P. Wyżga, L. Jaworskaa, S. P. Hannulab, *Al$_2$O3-cBN composites sintered by SPS and HPHT methods*, Journal of the European Ceramic Society, Volume 36, Issue 7, p. 1783-1789 (2016) (incorporated by reference). Klimczyka reports "In the case of SPS, cBN to hBN transformation probably occurs on the whole surface of cBN grains and proceeds to the core of grains with the increase of temperature (and duration) because SPS does not provide pressure conditions for thermodynamic stability of cBN".

SP sintering pressure. Spark plasma sintering may be performed at a pressure ranging from 10-100 MPA, preferably from 25 to 75 MPa, and most preferably from 40-60 MPa. These ranges include all intermediate values and subranges such as 10, 20, 25, 30, 35, 40, 45, 50, 55, 60, 65, 70, 75, 80, 85, 90, 95, <100 and 100 MPa.

SP sintering temperature. Spark plasma sintering may be performed at a temperature ranging from 1,200° C. to 1,600° C., preferably at 1,300-1,500° C., and most preferably at 1,350-1,450° C. These ranges include all intermediate values and subranges such as 1,200, 1,250, 1,300, 1,350, 1,400, 1,450, 1,500, 1,550, <1,600 and 1,600° C. In some embodiments of the method, the heating rate will range from 25, 50, 75, 100, 125, 150, or 200° C./min. Heating and cooling rates may both be higher than heating and cooling rates for conventional sintering. Holding time at sintering duration is minimal and may be less than holding time for other conventional sintering methods.

Sintering time. Conventional (non-SPS) sintering times are measured in hours and facilitate the transformation of cBN into softer hBN. Preferably a spark plasma sintering time is selected that minimizes the conversion of cBN into hBN. It may also be based on the nature of the staring matrix materials, the time constraints, as well as on the final properties desired in the sintered composite produced. Many embodiments of the invention have sintering or holding times of less than about 5-60 mins. This range includes all intermediate values and subranges such as about 5, 10, 15, 20, 25, 30, 35, 40, 45, 50 and 60 mins.

"Nano-sized" refers to an average particle size ranging from 1 nm to <1,000 nm, which range includes all intermediate values and subranges, such as 1, 2, 5, 10, 15, 20, 25, 30, 35, 40, 45, 50, 60, 70, 75, 100, 150, 200, 250, 300, 350, 400, 450, 500, 550, 600, 650, 700, 750, 800, 850, 900, 950, and <1,000 nm (transmission electron microscopy, TEM). Preferably, the size of the alumina matrix particles is selected to minimize hBN content in sintered alumina-cBN composite. Alumina or Al$_2$O$_3$ particles used for SPS sintering of alumina-cBN composites preferably, range in size from 25 nm to 500 nm, more preferably, from 50 nm to 250 nm (TEM).

"Micro-sized" refers to an average particle size ranging from 1 μm to <1,000 μm (TEM), which range includes all intermediate values and subranges, such as 1, 2, 5, 10, 15, 20, 25, 30, 35, 40, 45, 50, 60, 70, 75, 100, 150, 200, 250, 300, 350, 400, 450, 500, 550, 600, 650, 700, 750, 800, 850, 900, 950, and <1,000 μm (TEM). A clear distinction between the micron and nano size alumina was observed in SEM analysis and particles size measurement via dynamic light scattering technique.

Hardness. Many embodiments of the composite according to the invention exhibit Vickers hardness ($H_{v2}$) of greater than 22, 23, 24, 25, 26, 27, 28 or 29 GPa. (ASTM E384 Knoop and Vickers Hardness Testing).

Density is measured based on Archimedes' method with deionized water as the immersion medium, using density determination equipment (METTLER Toledo).

Relative density of a composite of the invention may be measured with respect to a reference sintered product, such as an otherwise similar sintered alumina matrix made without a cBN additive or made without nickel-coated cBN, or to an otherwise similar composite that is conventionally sintered not using SPS.

Porosity may be measured by methods known in the art, including those described by Characterization of Materials, 2$^{nd}$ edition, "Porosity and its Measurement" available at http://_onlinelibrary.wiley.com/doi/10.1002/0471266965.com129/full (last accessed Sep. 12, 2017, incorporated by reference). Crack resistance may be measured by methods known in the art, such as those taught or referenced by Lett, J. Materials Sci. 30 (1995) 4617-4622 Wear-resistance may be determined by methods known in the art including the dry sliding wear test method described or referenced by Kim, et al., Metallugical and Materials Transactions, (2010), 41: 380 which is incorporated by reference.

Thermal conductivity, thermal diffusivity, and thermal stability may be measured by methods known in the art, including by those taught by Rutkowski, et al., J. Thermal Analysis and Calorimetry, (2015) 122(1):105-114 (incorporated by reference).

Methods for determining the physical properties described above as well as other physical properties such as strength, fracture toughness, expansion and densification are generally known in the art and are incorporated by reference to the documents cited herein.

A physical property of the composite of the invention, including a mechanical, chemical or thermal property, may vary upward or downward by at least 1, 2, 3, 4, 5, 10, 15, 20, 25, 30, 35, 40, 45, 50, 55, 60, 65, 70, 75, 80, 85, 90, 95 100% or more (or any intermediate value within this range) compared to an otherwise similar composite made without a cBN additive or made without nickel-coated cBN, or to an otherwise similar composite that is conventionally sintered not using SPS.

Generally, a composite of the invention will exhibit superiority in one or more of these physical properties compared to those of otherwise similar products made using conventional sintering procedures without SPS, sintered products made using alumina particles that are not nano-sized, or sintered products using cBN instead of nickel-coated cBN. For example, the inventors have observed superior mechanical and thermal properties of nano-alumina-cBN/Ni coating composites.

The following examples illustrate various aspects of the present invention. They are not to be construed to limit the claims in any manner whatsoever. Nonlimiting embodiments of the invention include:

One embodiment of the invention is a method for making an alumina-cubic boron nitride ("Al$_2$O$_3$-cBN") composite comprising spark plasma sintering cBN particles, which may be nickel coated, with nano-sized alumina particles. The nanosized alumina particles may range in size from no more than 25, 50, 100, 200, 300, 400, 500, 600, 700, 800, 900 or <1,000 nm. Preferably, the alumina particles will range from 25 to 500, more preferably from 50 to 250 nm (transmission electron microscopy, TEM).

The cBN or nickel-coated cBN particles maybe nano- or microsized particles, for example, they may range in size from 1, 5, 10, 20, 30, 40, 50, 100, 200, 300, 400, 500, 600, 700, 800, 900, 100 or 200 µm. For example, they may range in average particle size from 5-60, 5-50, 5-40, 5-35, 5-30, 2-25, 5-20, or 5-10 µm (TEM).

In some embodiments this method will sinter cBN particles that are substantially cBN without a nickel coating to produce alumina-cubic boron nitride ("$Al_2O_3$-cBN") composite. In other embodiments, the cBN particles may be coated with nickel to produce an alumina-cubic boron nitride ("$Al_2O_3$-cBN/Ni") composite.

The cBN particles will be of a size suitable for spark plasma sintering. They may be nano- or microsized particles, may have a distribution of different diameters or volumes, and may have spheroidal or other geometric shapes. An amount of nickel may be selected to inhibit or reduce the conversion of cBN to hBN during sintering.

In other embodiments, nickel content of the coated cBN particles may range from about 0.01 to 95 wt % based on the total weight of the coated cBN particles, for example, nickel-coated cBN particles may contain 0.01, 0.05, 0.1, 0.5, 1, 5, 10, 20, 30, 40, 50, 60, 70, 80, 85 or 90 wt % nickel or any intermediate value or subrange.

In most embodiments, the cBN particles will contain sufficient nickel to increase Vickers hardness or to improve other physical qualities of a sintered alumina composite described herein compared to an otherwise identical sintered product made using cBN particles that are not nickel coated.

In most embodiments, the SPS method of the invention will sinter nano-sized alumina particles, such as nanosized alpha-alumina particles. In some embodiments, the average particle size of the nano-sized alumina particles is no more than 25, 50, 75, 100, 150, 200, 250, 300, 350, 400, 450, or 500 nm or any intermediate value of subrange within this range. In other preferred embodiments, the average particle size of the alumina will range from about 50 to 250, from 75 to 200, or from 100 to 175 nm.

In some embodiments, other components may be sintered or otherwise admixed with alumina and cBN or nickel-coated cBN, such as $Si_3N_4$, SiC, $ZrO_2$ or nanotubes such as carbon or boron nitride nanotubes.

Another embodiment of the invention is directed to increasing the density, wear-resistance, and/or hardness of an alumina-cubic boron nitride ("$Al_2O_3$-cBN") composite comprising sintering particles of alumina and cBN under conditions that inhibit transition of cBN into hBN. Such conditions include but are not limited to one or more of (i) spark plasma sintering of alumina and cBN, (ii) sintering nanosized alumina particles, such as those having a particle size ranging from 25 to 500 nm or from 50 to 250 nm, with cBN, or (iii) sintering nanosized alumina particles such as those having a particle size ranging from 25 to 500 nm, or 50 to 250 nm, with nickel-coated cBN. For example, some embodiments of the SPS method of the invention will produce an alumina-cubic boron nitride ($Al_2O_3$-cBN) or alumina-cubic boron nitride/nickel ($Al_2O_3$-cBN/Ni) composite having a higher Vickers hardness than an otherwise identical sintered composite that was not spark plasma sintered, that was sintered from alumina particles having an average particle size of 1,000 nm or more, or that was sintered from cBN particles that were not coated with nickel.

In some embodiments of the method of the invention, the starting materials for producing an alumina-cBN or alumina-cBN/Ni composite will be mixed, for example, by use of an ultrasonic sonicator probe, prior to spark plasma sintering. Optionally, they may be dried and ground using a mortar and pestle or other conventional grinders.

The invention also embodies an alumina-cBN or alumina-cBN/Ni composite made by the methods described herein. In some embodiments these composites will be spark plasma sintered (SPS) from alumina particles ranging in average size from about 50 to 250, from 75 to 200, or from 100 to 175 nm and/or from cBN or nickel-coated cBN particles containing 50-70 wt % nickel ranging in average size from 30-70 and 40-50 µm or any intermediate value within these ranges or other ranges specified herein. In other embodiments the composites may be produced from alumina, cBN, nickel-coated cBN, having other particle sizes or chemical compositions as described elsewhere herein.

Another embodiment of the invention is directed to an $Al_2O_3$-cBN or $Al_2O_3$-cBN/Ni composite, which is produced by spark plasma sintering cBN particles or nickel-coated cBN particles or nanosized alumina particles, wherein about 0.01, 0.05, 0.1, 0.5, 0.75, 1, 1.25, 1.5, 1.75 or 2 wt % or less of the BN content is in the form of hBN and/or where at least 98, 98.5, 99, 99.5 or 99.9 wt % of the BN content is present in the composite as cBN.

Other embodiments of the invention are directed to an $Al_2O_3$-cBN or $Al_2O_3$-cBN/Ni composite that is produced by spark plasma sintering cBN particles or nickel-coated cBN particles with nanosized alumina particles, such as alumina particles ranging in size from 25-<1,000 nm or ranging in size from 25-500 nm, wherein the composite has one or more physical, chemical or mechanical properties superior to those of an otherwise identical composite that was not spark plasma sintered, that was sintered from alumina particles having an average particle size of 1,000 nm or more, or that was sintered from cBN particles that were not coated with nickel. Such properties include but are not limited to a higher relative density, lower porosity, higher densification, higher resistance to cracking, longer wear-resistance, higher strength, higher thermal conductivity, higher thermal effusivity, lower expansion, lower phase transformation from cBN to hBN, superior microstructure and higher toughness.

The alumina-cBN composite of the invention may be used to form a material such as a durable solid material, granule or powder. It may be incorporated into a tool or machine component such as a cutting or abrasive tool, mold, die, break-ring, nozzle, glass or metal forming refractory or tool, high temperature refractory shape, furnace vent, stack or fixture, generator component, reactor component, turbine component, engine component, vehicular component, aerospace component, ship, submarine, or aircraft component, weapon, or armor; or component hereof. As a powder or granule (e.g. having grains ranging from 0.001 to 2 mm in average size (TEM) it may be incorporated into or onto an abrasive surface such as a surface or into a gaseous, liquid or solid composition for grinding, polishing, buffing, honing, cutting, drilling, sharpening, lapping, or sanding.

While not being bound to any particular explanation, the inventors believe that the superior physical, chemical, thermal, and mechanical properties of the alumina-cBN and alumina-cBN/Ni composites of the invention are attributable to inhibition of cBN to hBN phase transformation. This undesirable phase transition may be inhibited or prevented by the selection of nanosized alumina particles, nickel-coated cBN particles and by use of which, in some embodiments, is in turn is attributable to the nickel coating on the surface of pulse-based, faster and efficient heating provided by selection of spark plasma sintering. These factors may help in consolidating the resulting ceramic composite in a short period of time that is not long enough for substantial transformation of cBN to hBN to occur.

EXAMPLES

The following examples illustrate various aspects of the present invention. They are not to be construed to limit the claims in any manner whatsoever. As exemplified herein, alumina-cubic boron nitride (cBN) composites were synthesized using non-conventional spark plasma sintering (SPS) techniques. Alpha-alumina powders having micro-particle sizes of 150 μm or nano-particle sizes of 150 nm were used in the matrix while cBN particles with and without nickel coating were used as the reinforcements. The properties of alumina-cBN composites containing 1, 10, 20 or 30 wt % of uncoated or nickel-coated cBN particle (reinforcements) were compared. In some of these examples, powder materials were sintered at a temperature of 1,400° C. while a constant uniaxial pressure of 50 MPa was maintained throughout the process. The effect of size of starting alumina powder as well as that of nickel coating on cBN to hBN phase transformation and thereby on the thermo-mechanical properties of the composites was evaluated.

Surprisingly, substantially complete restriction of the cBN to hBN transformation was observed for complexes made by SPS of nano-sized alumina particles. Composites prepared using 150 nm particle size alumina and 30 wt % nickel-coated cBN exhibited the highest relative density of 99% along with a high Vickers hardness value of 29 GPa.

Density is measured based on Archimedes' method with deionized water as the immersion medium, using density determination equipment (METTLER Toledo). Composites density was measured by rule of mixture, whereas: Rule of Mixtures is a method of approach to approximate estimation of composite material properties, based on an assumption that a composite property is the volume weighed average of the phases (matrix and dispersed phase) properties.

In contrast, in composites made by sintering 150 μm sized alumina particles, a phase transformation of cBN to hBN was observed and the relative densification decreased. The hardness values for these compositions varied between 20.95-22.86 GPa. However, in composites produced with micro-sized alumina, use of nickel coating on the cBN particles (reinforcements) hampered the cBN to hBN transformation resulting in an improved hardness value of up to 24.64 GPa.

Example 1

Sintering Procedures

Alpha-alumina powder having an average particle size of 150 μm (Sigma-Aldrich, USA) or 150 nm (Chempur, Germany) was used as the matrix.

Cubic boron nitride having an average particle size of 42 μm (Element Six, ABN800, USA), with or without a 60 wt. % Ni coating were used as reinforcements.

The compositions of Samples 1-7, sintered using micro-sized particles of $Al_2O_3$, and those of Samples 8-13, sintered using nano-sized particles of $Al_2O_3$, are described by Table 1.

TABLE 1

Composition of alumina-cBN samples in wt %. Samples 1 to 7 describe particle size in μm and samples 8 to 14 describe particle size in nm.

| Ingredient | $Al_2O_3$ (grams) | cBN (grams) | Ingredient | $Al_2O_3$ (grams) | cBN (grams) |
|---|---|---|---|---|---|
| Particle size | 150 μm | 42 μm | | 150 nm | 42 μm |
| Samples #1-7 (micro particles of $Al_2O_3$) | | | Samples #8-14 (nano particles of $Al_2O_3$) | | |
| 1 | Pure $Al_2O_3$* | 9 | 0 | 8 Pure $Al_2O_3$* | 9 | 0 |
| 2 | $Al_2O_3$ 10 wt % cBN | 8.1 | 0.9 | 9 $Al_2O_3$ 10 wt. % cBN | 8.1 | 0.9 |
| 3 | $Al_2O_3$ 20 wt. % cBN | 7.2 | 1.8 | 10 $Al_2O_3$ 20 wt. % cBN | 7.2 | 1.8 |
| 4 | $Al_2O_3$ 30 wt. % cBN | 6.3 | 2.7 | 11 $Al_2O_3$ 30 wt. % cBN | 6.3 | 2.7 |
| 5 | $Al_2O_3$ 10 wt. % cBN-Ni | 8.1 | 2.25 | 12 $Al_2O_3$ 10 wt. % cBN-Ni | 8.1 | 2.25 |
| 6 | $Al_2O_3$ 20 wt. % cBN-Ni | 7.2 | 4.5 | 13 $Al_2O_3$ 20 wt. % cBN-Ni | 7.2 | 4.5 |
| 7 | $Al_2O_3$ 30 wt. % cBN-Ni | 6.3 | 6.75 | 14 $Al_2O_3$ 30 wt. % cBN-Ni | 6.3 | 6.75 |

*Pure $Al_2O_3$-150 μm (grams) refers to the micro-sized alumina and
*Pure $Al_2O_3$-150 nm (grams) refers to the micro-sized alumina.

Sample mixtures were homogenized using an ultrasonic probe sonicator (Model VC 750, Sonics, USA) in ethanol as a mixing medium. Ethanol was later dried off in furnace at 80° C. for 24 hrs. The powder mixtures were consolidated by employing SPS equipment (FCT system, model HP D5, Germany).

The powder mixture was placed in 20 mm graphite die. Each sample was sintered at 1,400° C. The heating rate adopted was 100° C./min while a constant pressure of 50 MPa was applied. To make the sample removal from the die easy and to avoid the wear and tear of punches, a graphite sheet of 0.5 mm thick was inserted between the graphite die and powders. In addition, to minimize the heat loss, the die was covered with graphite blanket during the sintering process. The samples were sintered at the temperature of 1,400° C. with holding time of 10 minutes. The sintering temperature was measured using a pyrometer observing the radiation near to the sample.

To remove graphite sheet and have a clean surface, sintered samples were first ground on the 60 grit size SiC paper, followed by grinding on the diamond disc. For mechanical and microstructural investigations, samples were ground and polished on Buehler grinding machine, Automat 300. In grinding diamond wheels from 74 μm down to 10 μm grit size were used, followed by the use of diamond polishing suspensions down to 0.25 μm.

Example 2

Physical Characterization of Samples 1-14

Following SPS and the grinding process, the density of the sintered samples was measured based on Archimedes' method with deionized water as the immersion medium, using density determination equipment (METTLER Toledo). The reported density is the average of ten measurements.

The Vickers hardness tester (Buehler, USA) was used to measure the hardness under the application of 20N load (P). The reported hardness is the average of 10 measured values. The fracture toughness was evaluated by employing the mathematical relationship, Eq. (1), using the half length of the crack (c) formed around the corners of the indentations; M. Hotta, T. Goto, Densification and microstructure of $Al_2O_3$-cBN composites prepared by spark plasma sintering, Journal of the Ceramic Society of Japan, 116 (2008) 744-748 (incorporated by reference).

Thermal conductivity and effusivity were determined by thermal conductivity analyzer (C-THERM-TCi).

To identify the phases present in the sintered samples, a Rigaku MiniFlex X-ray diffractometer (Japan) was used with Cu Kα1 radiation (γ=0.15416 nm), tube current=10 mA and an accelerating voltage of 30 kV.

Point and line Raman spectrums of the reinforced cBN particles were acquired by using a DXR2 Raman microscope. The 532 nm laser line was used as the excitation wavelength. The laser power of 2.5 mW was used. The spectrums were acquired at 25° C. between 100 and 3000 $cm^{-1}$.

Field emission scanning electron microscope (FESEM, Lyra 3, Tescan, Czech Republic) with accelerating voltages of 20 kV was used to characterize the microstructure of sintered samples and powders.

$$K_{IC}=0.073\times(P/c^{1.5}) \quad \text{eq. (1)}$$

Phase Analysis

Figure 1C:
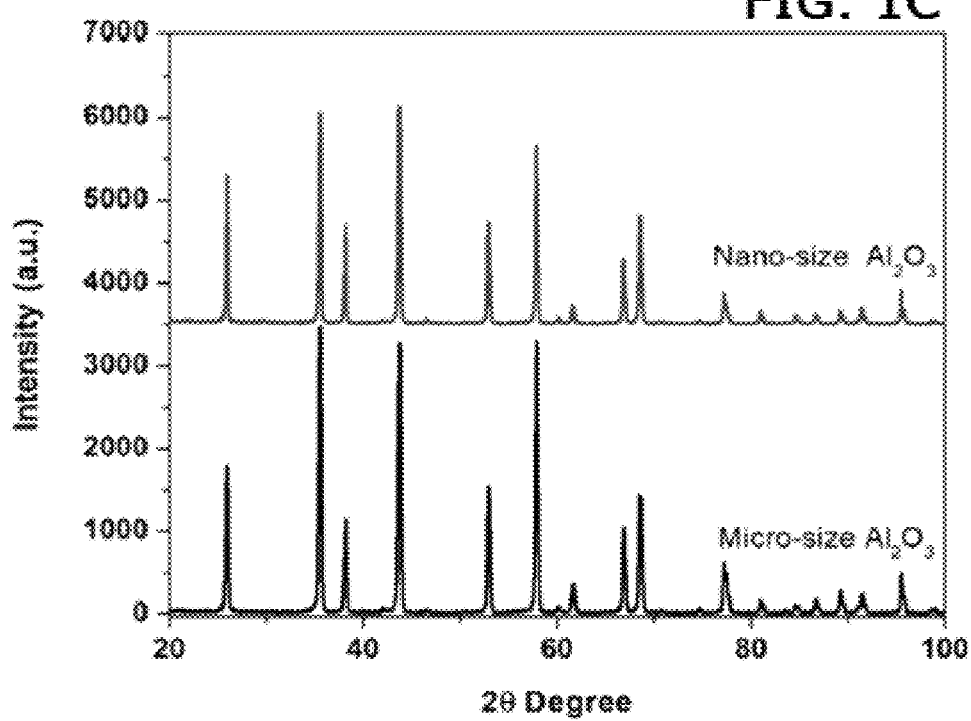
Figure 1F:
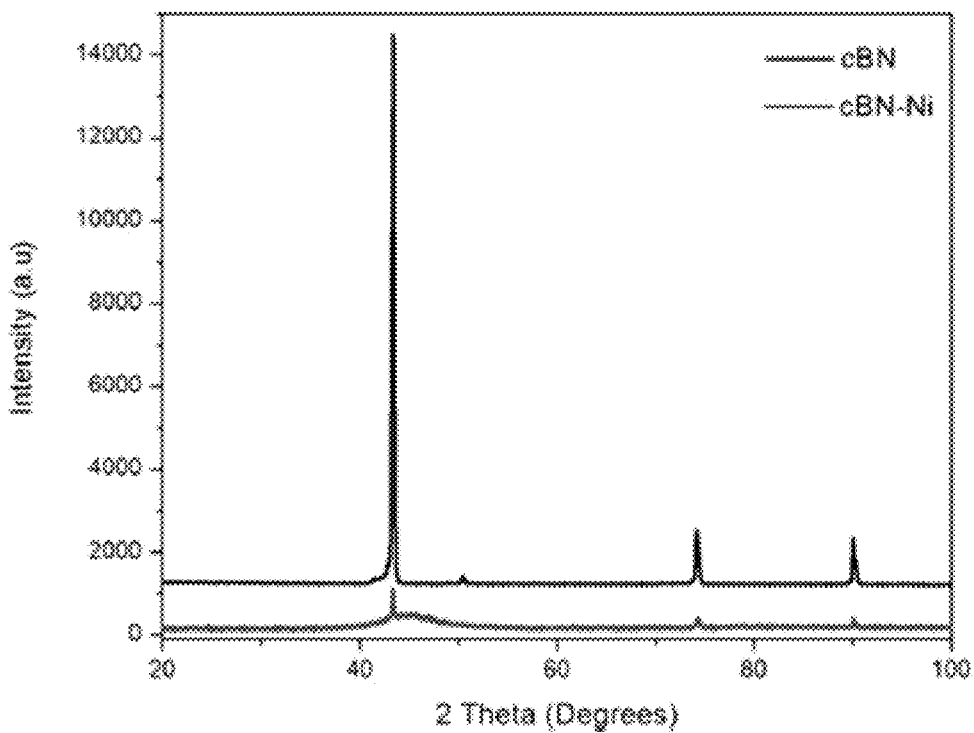

FIGS. 1A and 1B show FESEM micrographs of as-received micro/nano-sized alumina ($Al_2O_3$) powders. It is clear that micro-sized $Al_2O_3$ particles have a size up to 15 μm. However, nano-sized $Al_2O_3$ particles are of average size ~150 nm. XRD analysis was carried out for both kinds of alumina powders as shown in FIG. 1C. According to the data of X-ray analysis, the main phase in both cases was α-$Al_2O_3$. FIGS. 1D and 1E show FESEM micrographs of the as-received cBN particles (with dimensions of 42 μm) without and with nickel coating, respectively. FIG. 1F shows the XRD patterns of these samples. The uncoated cBN sample yielded three clear XRD peaks at 2θ values of approximately 43.2°, 74.4° and 90.1°, whereas the Ni-coated cBN yielded very weak peaks at these angles, suggesting that the cBN was almost entirely shielded by the Ni coating. The diffraction peaks at 2θ of approximately 44.2° were indexed to nickel.

Figure 2A:
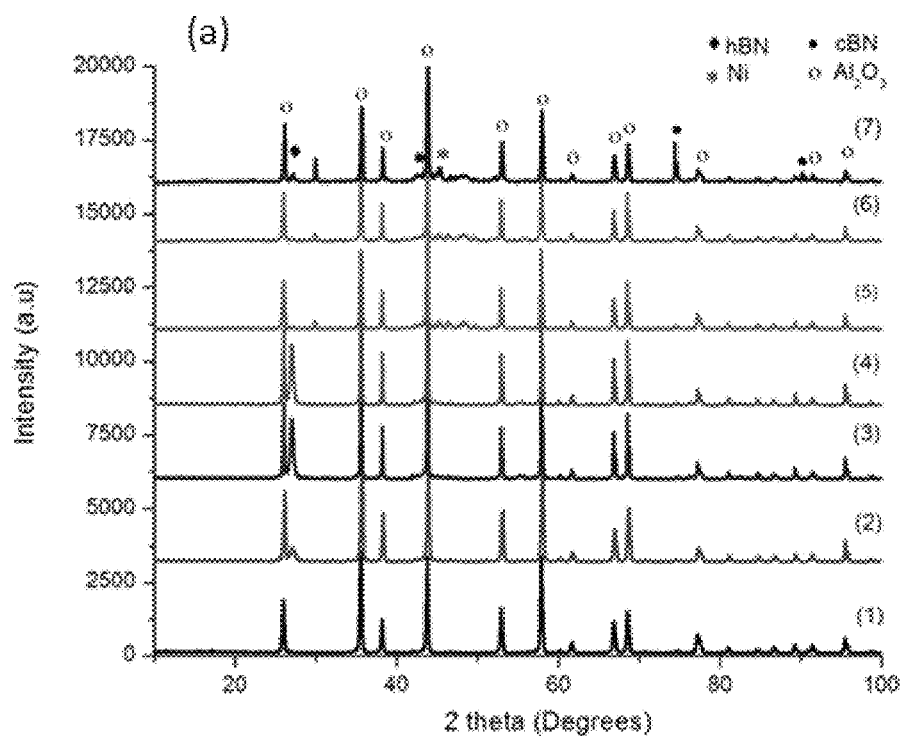
FIGS. 2A and 2B. X-Ray Diffraction (XRD) patterns of sintered samples.
Figure 2B:
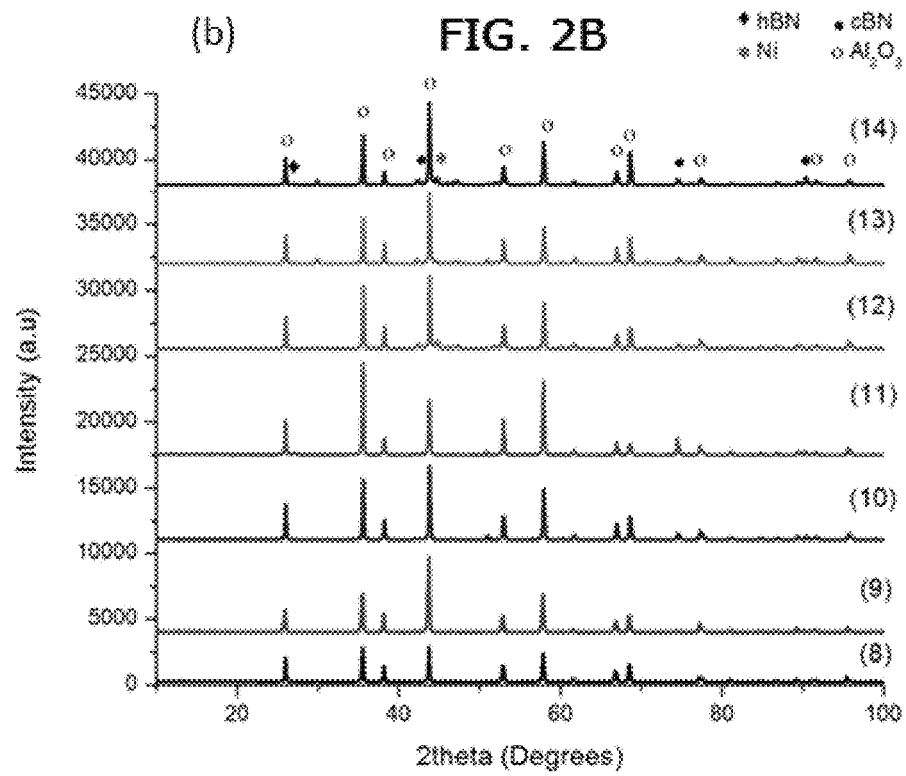

FIG. 2 shows the XRD patterns of the $Al_2O_3$-cBN composites that had been sintered at 1,400° C. for 10 min at a pressure of 50 MPa. Analysis of the XRD patterns indicated that there was a prominent transformation from cBN to hBN in compositions containing microsized alumina with and without Ni coating. As the concentration of cBN was increased from 10 to 20-30 wt %, the intensity of the diffraction peak corresponding to hBN clearly increased (FIG. 2A, samples 2, 3 and 4), indicating that the transformation from cBN to hBN became more prominent. As the concentration of cBN was increased in this manner in the micro-sized alumina matrix compositions without Ni, the percentage of the cBN that transformed to hBN increased from 40% to 75% (FIG. 2A, samples 2, 3 and 4). The XRD patterns of the samples synthesized using nano-sized alumina reinforced with cBN particles (with and without nickel coating) are shown in FIG. 2B. For these samples, no evidence of a transformation from cBN to hBN was observed.

While not being bound to any particular explanation of this phenomenon, the larger surface area associated with the nanosized alumina particles may have restricted the transfer of thermo-mechanical stress to the cBN particles, thereby preventing the cBN to hBN transformation. The XRD spectrum findings confirm that there was no chemical reaction between alumina and cBN. Non-reactivity of $Al_2O_3$ and cBN is advantageous for the fabrication of fully dense and strongly bonded cBN-based ceramic composites. While no reaction was identified between cBN and Ni, surprisingly, the inventors observed that the presence of Ni restricted the transformation of cBN to hBN. In contrast, it has been reported that the transformation of cBN to hBN was promoted by the catalytic activity of Ni; see J. Zhang, R. Tu, T. Goto, Spark plasma sintering of $Al_2O_3$-cBN composites facilitated by Ni nanoparticle precipitation on cBN powder by rotary chemical vapor deposition, Journal of the European Ceramic Society, 31 (2011) 2083-2087.

While not being bound to any particular explanation, it appears that for the micro-sized (15 μm) alumina particles, the thermo-mechanical stresses involved in the synthesis process were apparently transferred quite efficiently to the cBN particles, thereby causing an enhanced cBN-to-hBN phase transformation. Such thermo-mechanical stresses may have arisen from uniaxial loading, plastic deformation during heating and the holding time, thermal shock, and differences in the rates of thermal expansion for the different entities of the composite. While not being bound to any particular explanation, the inventors hypothesized that the larger specific surface area associated with the nano-sized alumina particles restricted the transfer of thermo-mechanical stress to the cBN particles, thereby preventing the cBN-to-hBN transformation.

To further elucidate the above-described effect of the size of the alumina matrix on the cBN-to-hBN transformation, Raman microscopic studies were performed. The Raman spectra of the cBN reinforced nano-sized alumina are shown in FIG. 3A. The presence of peaks at 1056 cm$^{-1}$ and 1307 cm$^{-1}$, which derived from the cBN phase, clearly indicated that the nano-sized alumina powder prevented the transformation of cBN particles to the hBN phase.

Figure 3B:
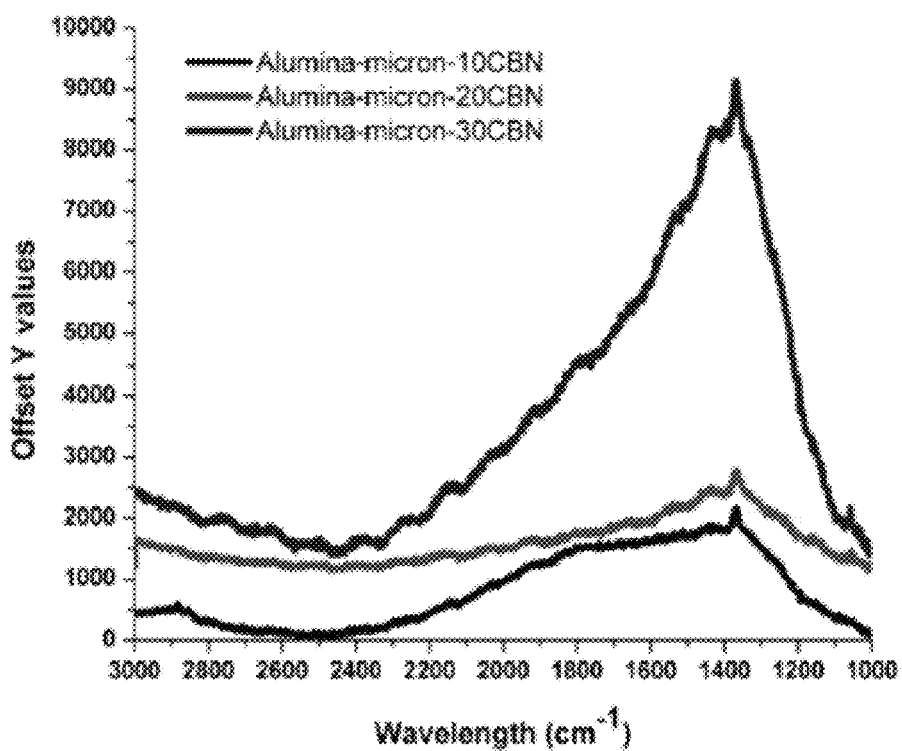

In contrast, the Raman spectra of the micro-sized alumina particles reinforced with cBN did not show the cBN peaks at 1056 cm$^{-1}$ and 1307 cm$^{-1}$ with high intensity but did show the hBN phase peak at 1367 cm–1, as a broad and asymmetric peak (FIG. 3B). The different Raman results obtained for the nano- and micro-sized alumina were attributed to the difference in the transfer of thermo-mechanical stress according to the particle size. As indicated above, the smaller specific surface area associated with the micro-sized alumina starting precursor apparently failed to restrict the transfer of a significant amount of thermo-mechanical stress to the reinforcing cBN particles. For this sample, both the XRD and Raman observations were consistent with the idea that a significant amount of thermo-mechanical stress caused a considerable amount of cBN to be transformed to hBN. The asymmetric and broad nature of the Raman peak for the micro-sized alumina reinforced with cBN particles was most probably due to the nano-crystalline nature of the freshly formed hBN phase.

The asymmetric high background is most probably due to the nano-crystalline nature of newly formed hBN phase; see T. Werninghaus, J. Hahn, F. Richter, and D. R. T. Zahn, Raman spectroscopy investigation of size effects in cubic boron nitride, Applied Physics Letters, August 1998 (incorporated by reference).

Figure 3C:
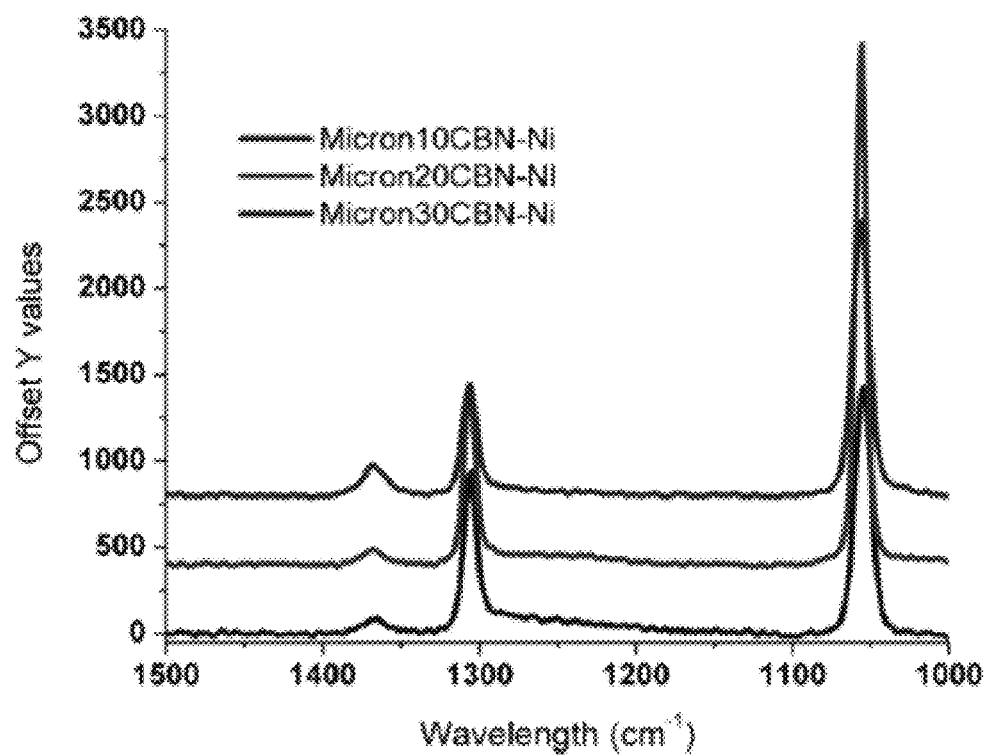
Figure 4A:
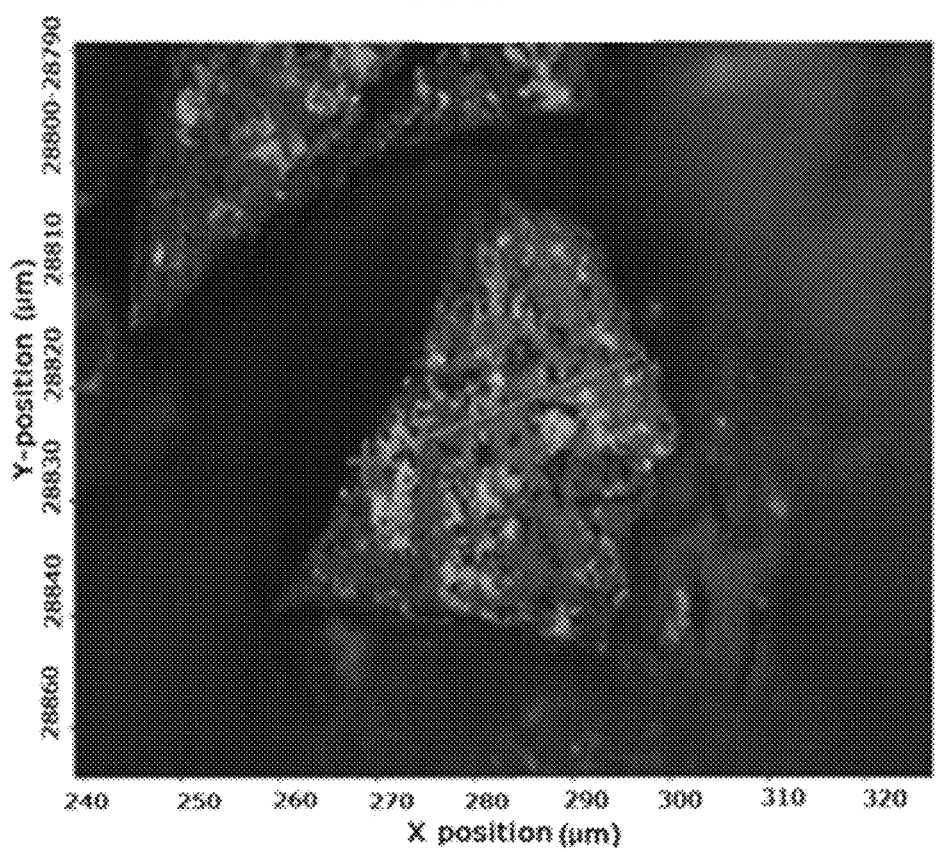
FIGS. 4A-4D.
Figure 4B:
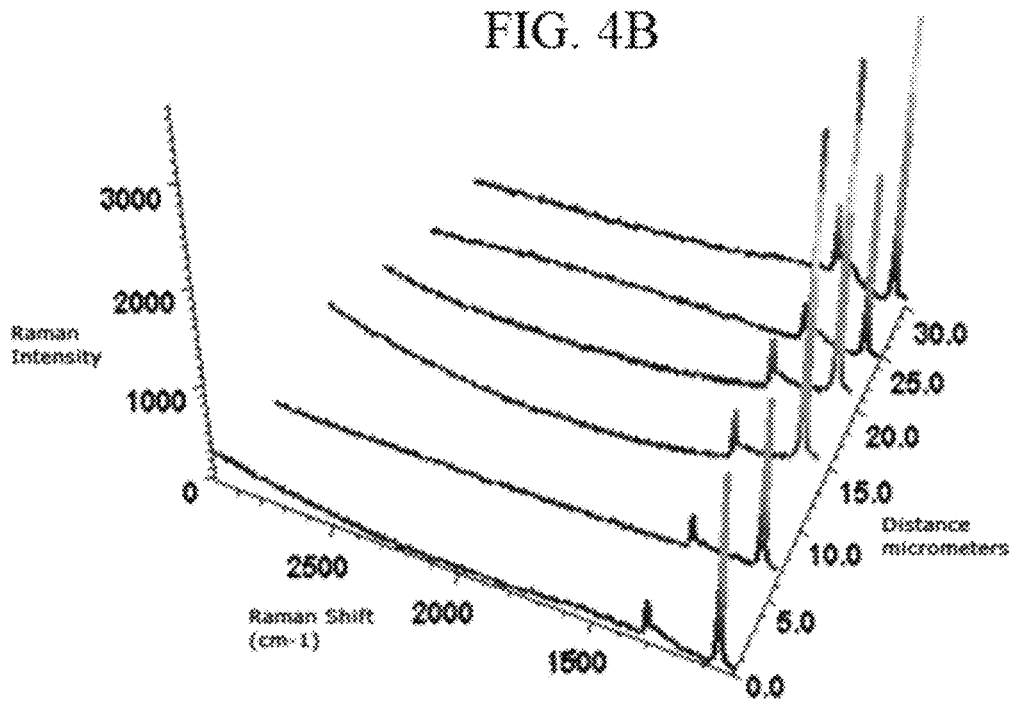
Figure 4C:
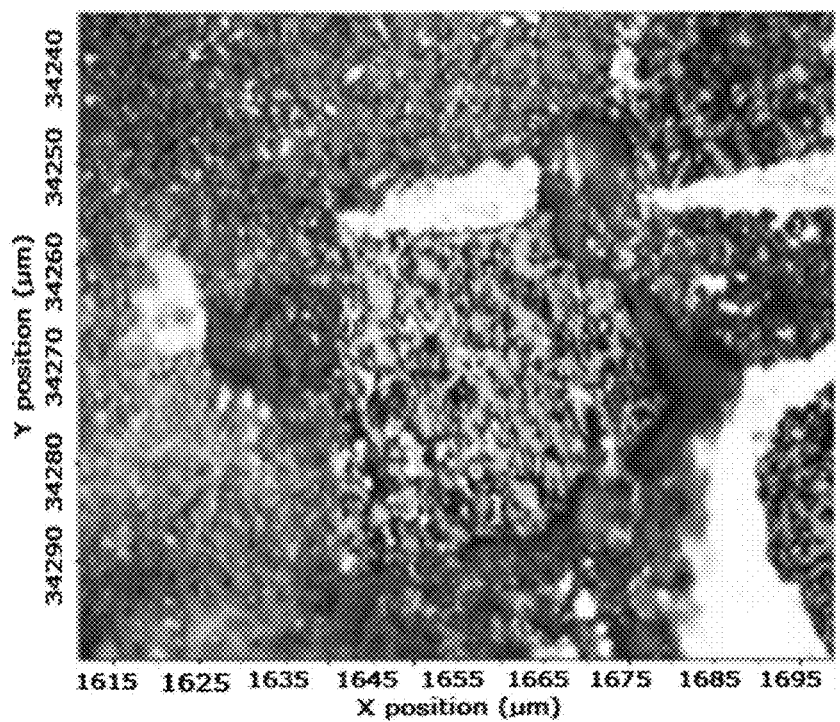
Figure 4D:
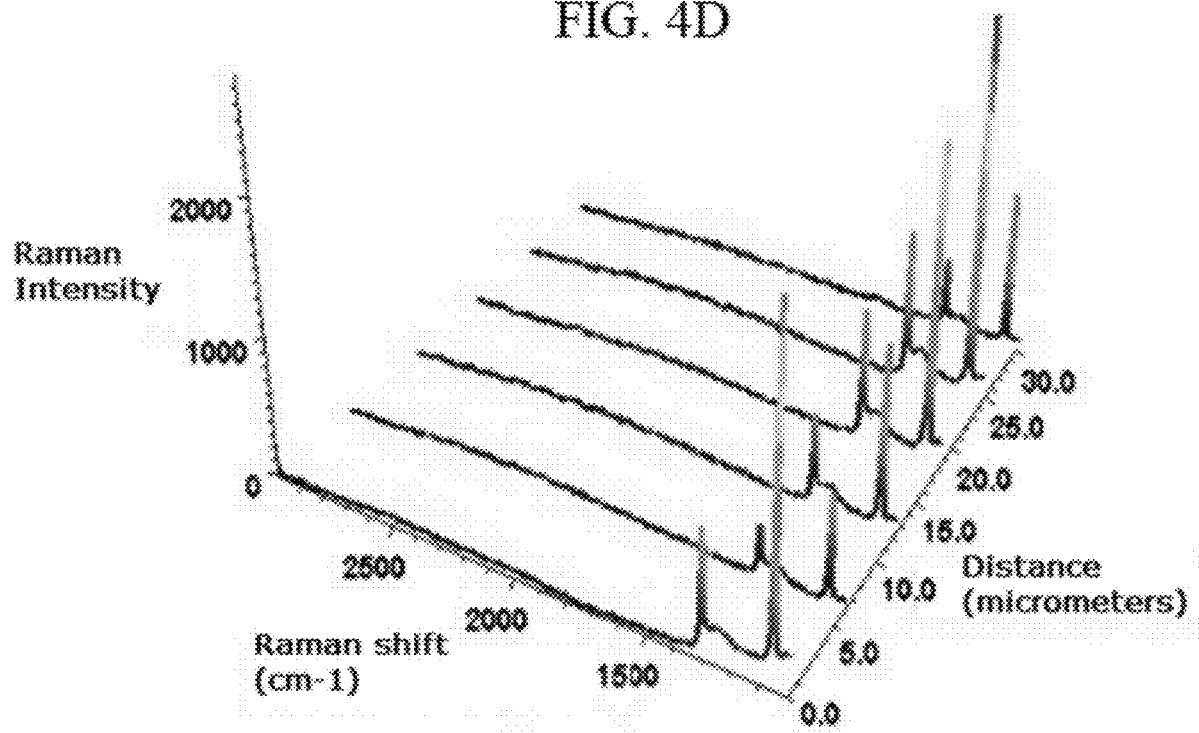

FIG. 3C shows Raman spectra of micro-sized alumina reinforced with nickel-coated cBN particles. Although the hBN peak was observed for these samples, this peak was now sharp, and sharp cBN peaks were also observed, together suggesting that the nickel coating was quite effective in reducing the transfer of thermomechanical stress and hence in reducing the extent of the phase transformation. This restricting effect of nickel coating on the cBN-to-hBN phase transformation was also indicated by the above-described XRD results for the micro-sized alumina reinforced with nickel-coated cBN. To further characterize the phase transformation, Raman line maps spanning the widths of the cBN particles were generated. The samples synthesized using 30 wt % of cBN particles were subjected to the Raman line mapping feature Three-dimensional plots of the Raman spectra along with the corresponding images of the cBN particles are shown in FIGS. 4 and 5. For the nano-alumina samples, the only observable peaks were those derived from the cBN phase (FIGS. 4A and 4B). The absence of peaks corresponding to the hexagonal phase throughout the width of the cBN particles (with and without nickel coating) clearly suggested that the nano-sized alumina restricted the transfer of thermo-mechanical stress to the cBN particles.

Figure 5A:
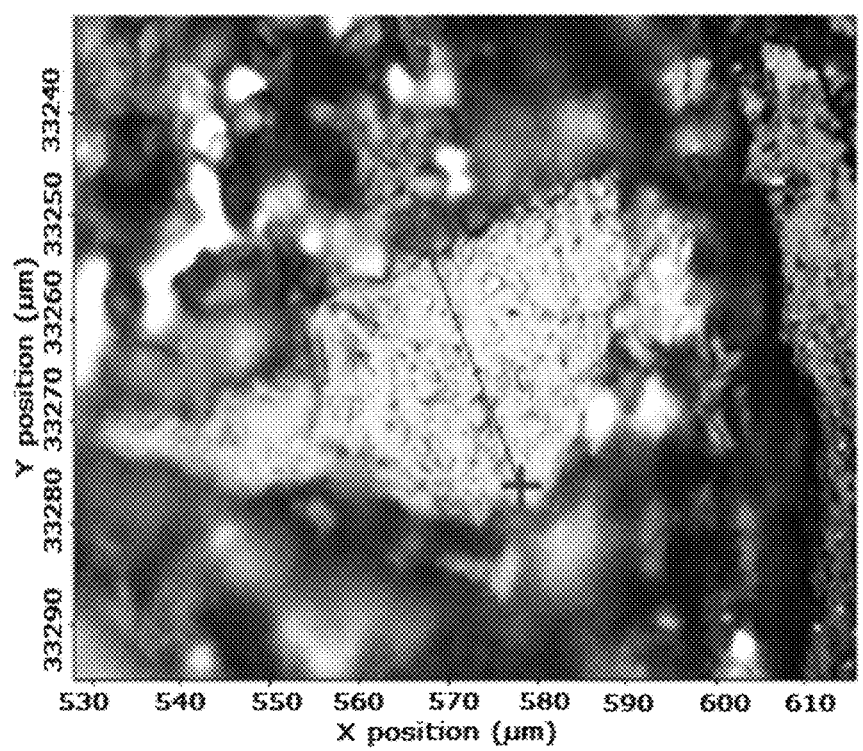
FIGS. 5A-5D.

For the samples synthesized with micro-sized alumina reinforced with nickel-coated cBN particles, both cBN and hBN peaks were observed in the line maps (FIG. 5A). However, the hBN phase peak derived from the periphery of the particle was observed to be more intense than that derived from its center. This result suggested that the phase transformation was more extensive at the exterior surface of the particles and initiated at the locations where the greatest stresses would have been expected to occur.

Figure 5B:
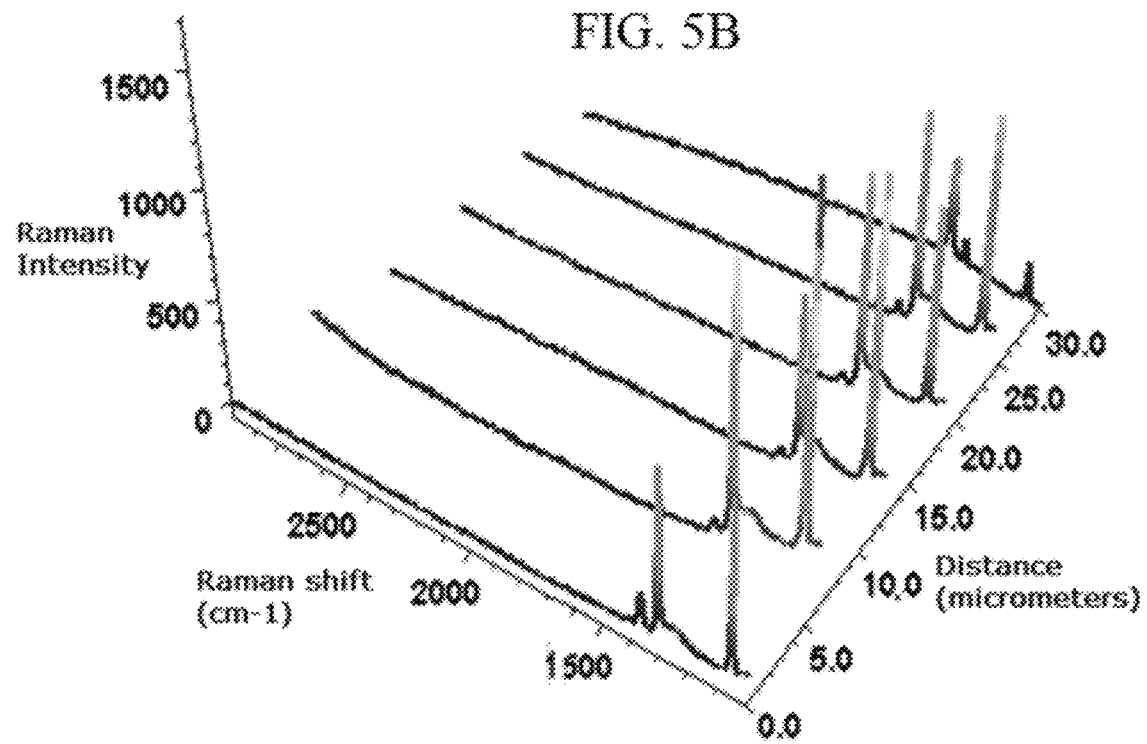
Figure 5C:
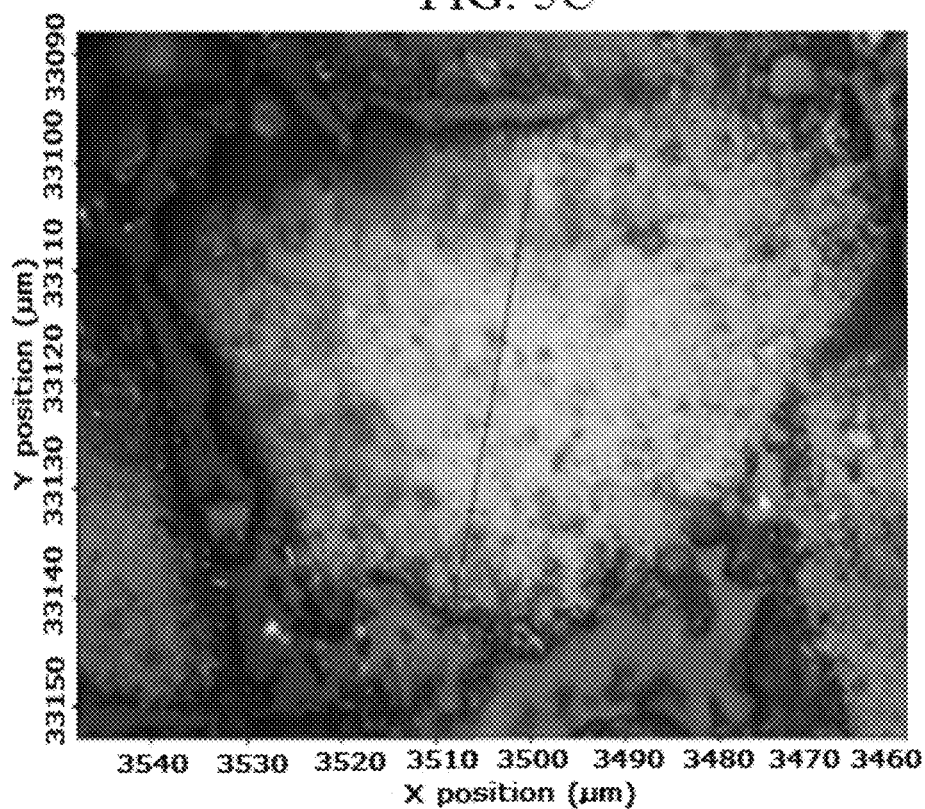
Figure 5D:
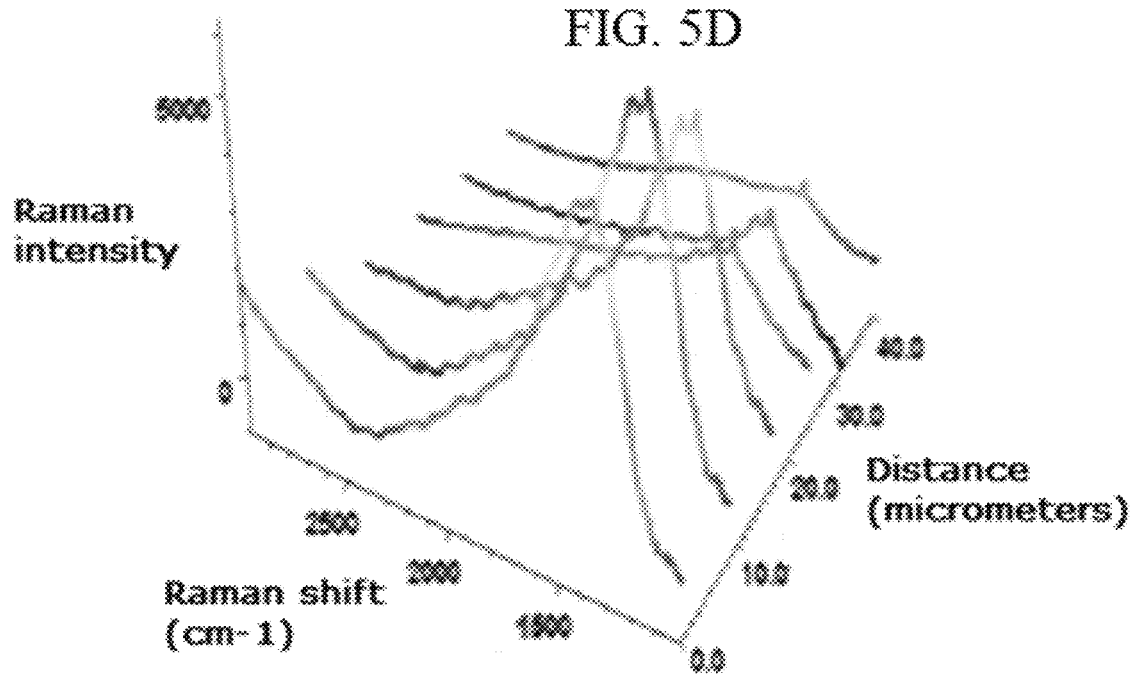

With regards to the samples synthesized using microsized alumina reinforced with cBN particles, the broad hBN peak was clearly observed for both the periphery of the particle and for the center (FIG. 5B). It seems that not only was the thermo-mechanical stress transferred to the core of these particles but also the grain size was small enough to contribute to a high Raman background.

FIGS. 6 and 7 show FESEM images of the micro- and nano-sized alumina cBN (10-30%), respectively, each without and with Ni coating. cBN particles were well dispersed in both the matrices. However, pores were observed in the polished surfaces of the micro alumina compositions, but not for the nano-sized matrix. This difference may have been due to the different matrix sizes, but also may have been due to the volume change resulting from the transformation of cBN to hBN that occurred only for the micro-sized alumina compositions. The above discussed phase transformation from cBN to the softer hBN in the micro-alumina compositions was clearly indicated by the morphologies observed in their FESEM images (FIG. 6B-6G). It seems that for microsized alumina, applied pressure generated sufficient localized stresses, which ultimately facilitated a transformation of cBN grains into hBN, and thus the morphology of transformed cBN appear quite distorted. In the micro-sized alumina compositions containing nickel-coated cBN, nickel appeared to have settled along the grain boundaries of the matrix, as shown in FIGS. 6C, 6E and 6G.

For the nano-alumina matrix compositions shown in FIG. 7B-7G, the composites were observed to be well consolidated, apparently due to the fine matrix size, and cBN particles were observed to be homogeneously dispersed in the matrix phase. The cBN particles were observed to have sharp angular edges that remained intact, as they did so in all of the nano-sized alumina matrix compositions, implying that there was a negligible phase transformation and that there was no chemical reaction between $Al_2O_3$, cBN and Ni.

In addition, a nickel coating was observed to be covering the edges of the cBN particles in the nano-sized matrix, as shown in FIGS. 7C, 7E and 7G, which presumably enhanced the bonding of the particles with the matrix and hence improved the strengths of these composites. In contrast, according to FIGS. 6C, 6E and 6G most of the nickel coating had detached from the cBN particles in the micro-sized alumina matrices, and settled into the pores of alumina matrices.

Figure 8B:
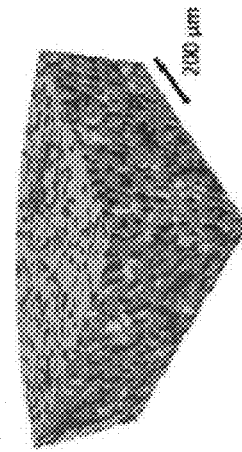
FIGS. 8A-8D show 3D cut Micro-CT cutaway sections of samples subjected to SPS. A grey color represents the alumina matrix while the dark grey represents cBN particles. Nickel is represented by the green color in the reconstruction.
Figure 8D:
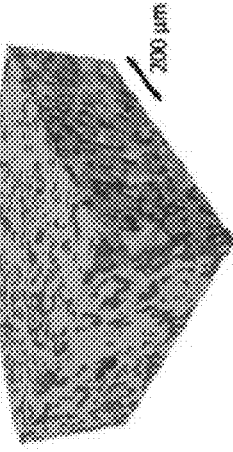
Figure 8A:
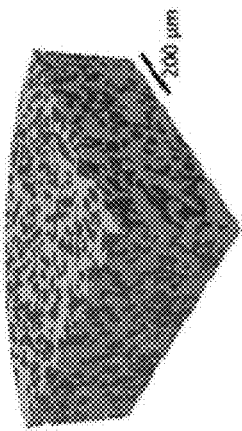
Figure 8C:

FIG. 8A-8D show a micro-CT analysis of the samples that had been subjected to SPS. To verify the distribution of the reinforcement particles and the results of this analysis were similar to but more convincing than those from the FESEM micrographs. A core with a diameter of 3 mm was cut and then used for scanning with a voltage of 60 kV and current of 165 µA. Reconstruction of the projection images was accomplished using N-Recon software. These projections were analyzed with CT-An software (Bruker) and the generated 3D models were analyzed using CT-Vol software (Bruker). The cBN particles (Table 1, sample ID: 4) were observed to be uniformly distributed throughout the alumina matrix; see FIG. 8A. A similar observation was made for cBN in the nano-sized alumina matrix; FIG. 8C (Table 1 sample ID: 7). The distribution of nickel around the cBN particles was also uniform in the micro- and nano-sized alumina matrices, as seen in FIGS. 8B and 8C (Table 1 samples ID: 11 and 14 respectively). This result confirmed that larger cBN particles (42 µm) were fairly well distributed in matrices of various sizes (from nanometers to microns) as a result of using probe sonication followed by drying and further mixing using a mortar and pestle.

Mechanical Properties. The Vickers hardness values of the samples are listed in Table 2. The micro-sized matrices reinforced with cBN were harder than the pure micro-sized alumina. However, as the amount of cBN included was increased from 10% to 30%, the hardness was observed to decrease slightly, from 22.86 GPa to 20.95 GPa, likely due to the increase in the extent of the cBN-to-hBN transformation with this increase in the amount of the reinforcement agent. Nickel-coated cBN yielded slightly greater hardness values (between 23.15 and 24.65 GPa) when used as the reinforcement in the micro-sized alumina matrix than did uncoated cBN. The improvement afforded by nickel was attributed to the nickel restricting the extent of the cBN-to-hBN transformation. In the nanosized alumina, the hardness values improved from 23.21 GPa to 26.91 GPa as the amount of the cBN reinforcements was increased from 0 to 30 wt %. This increase in hardness to the nanosized alumina matrix was attributed to completely hindering the cBN-to-hBN transformation. The hardness value further increased to 29.48 GPa with the addition of 30% nickel-coated cBN. Nickel coating along with the nano-sized alumina not only helped in restricting the cBN-to-hBN phase transformation but also helped in achieving highly densified composites, thereby resulting in outstanding mechanical and physical properties. Similarly, the thermal conductivity increased in both alumina matrices. Furthermore, of all the compositions tested, the sample with 30%-cBN-Ni in nano-sized alumina yielded the highest thermal conductivity value (35.75 W/m-k), as shown in Table 2. Lower thermal expansion values were observed for compositions having more cBN, and this relationship was likely due to pure cBN having a low thermal expansion value, of 1.2-1.5 ppm*k^−1, and thermal conductivity of 600-700 W/m-k. The inclusion of cBN thus restricted the thermal expansion of composites. Conversely, the thermal expansion increased as nickel was incorporated into either matrix, and this result was apparently due to nickel having a relatively high thermal expansion value, of 13-15 ppm*k^−1, and thermal conductivity of 85-95 W/m-k. The above results clearly confirmed the higher degree of consolidation achieved by using the nano-sized alumina matrix, as well as by adding more nickel to form the 30 wt % nickel-coated cBN re-enforcements. High levels of thermal conductivity could be beneficial for removing excess heat and hence lowering locally unduly high temperatures that may be generated during machining or cutting or other applications, and help reduce thermal shocks to the material that can be generated by cycles of heating and cooling.

TABLE 2

The composition properties and the results of the samples sintered at 1,400° C.

| Properties | Composite $Al_2O_3$ (150 micron particle size) | | | | | | |
|---|---|---|---|---|---|---|---|
| | 1 Pure | 2 10% cBN | 3 20% cBN | 4 30% cBN | 5 10% cBN-Ni | 6 20% cBN-Ni | 7 30% cBN-Ni |
| Density (g/cm$^3$) | 3.51 | 3.25 | 3.29 | 3.10 | 3.38 | 3.26 | 3.01 |
| Densification % | 88.95 | 83.61 | 85.79 | 81.77 | 93.32 | 95.65 | 92.49 |
| Hardness (Hv$_2$) | 19.37 | 22.86 | 21.79 | 20.95 | 24.64 | 23.89 | 23.15 |
| Fracture toughness MPa*m$^{1/2}$ | 3.84 | 3.18 | 3.31 | 3.83 | 3.49 | 3.34 | 3.18 |
| Thermal conductivity (w/m-k) | 25 | 27.84 | 25.78 | 26.16 | 22.40 | 24.69 | 24.29 |
| Thermal effusivity | 6669 | 10033 | 9689 | 9752 | 9091 | 9499 | 9381 |
| Thermal expansion ppm*k^−1 | 7.23 | 6.39 | 4.86 | 4.01 | 5.82 | 5.57 | 4.77 |

| Properties | Composite $Al_2O_3$ (150 nm particle size) | | | | | | |
|---|---|---|---|---|---|---|---|
| | 8 Pure | 9 10% cBN | 10 20% cBN | 11 30% cBN | 12 10% cBN-Ni | 13 20% cBN-Ni | 14 30% cBN-Ni |
| Density (g/cm$^3$) | 3.90 | 3.66 | 3.80 | 3.62 | 3.58 | 3.39 | 3.25 |
| Densification % | 98.64 | 93.97 | 98.89 | 95.57 | 98.64 | 99.53 | 99.71 |
| Hardness (Hv$_2$) | 23.21 | 25.22 | 25.94 | 26.91 | 27.32 | 28.35 | 29.48 |
| Fracture toughness MPa*m$^{1/2}$ | 4.11 | 4.50 | 4.19 | 3.78 | 4.01 | 3.98 | 3.84 |
| Thermal conductivity (w/m-k) | 21.88 | 23.39 | 32.93 | 26.88 | 30.33 | 33.57 | 35.75 |
| Thermal effusivity | 7779 | 8084 | 10836 | 9875 | 10568 | 10987 | 11252 |
| Thermal expansion ppm*k^−1 | 6.85 | 5.02 | 4.69 | 4.65 | 5.18 | 6.14 | 6.52 |

These data show that selection of a smaller nanoparticle size instead of a larger micro-sized alumina matrix prevents transformation of cBN into hBN during spark plasma sintering. Moreover, these data show that the presence or use of nickel-coated particles of cBN inhibited the transformation of cBN into hBN.

The mechanical properties of alumina were improved by the addition of cubic boron nitride along with Ni content. Ni goes into the pores and along the grains that cover them and improves the interface bonding strength, which results in more efficient load transfer and heat removal and improves other mechanical properties. Comparison of properties showed that reducing matrix particle size (150-nano) improves the hardness of 30 wt % cBN-150 Nano-$Al_2O_3$ composition, to the highest value of 29 GPa with a densification of 99%. The resulting composition can be successfully applied in cutting applications due to its favorable combination of hardness, toughness, thermal conductivity, and expansion.

Example 3

Effect of Variation of Alumina Particle Size in Starting Matrix

Several other sizes of starting alumina matrix (13 nm, 50 nm, or 1 um) were also used to synthesize alumina/30 wt % cBN composites. The samples were synthesized to further understand how smaller sized particles of alumina matrix restricts the cBN to hBN phase transformation. The classification of staring size of alumina powder as well that of cBN reinforcement is tabulated below in Table 3.

Figure 9A:
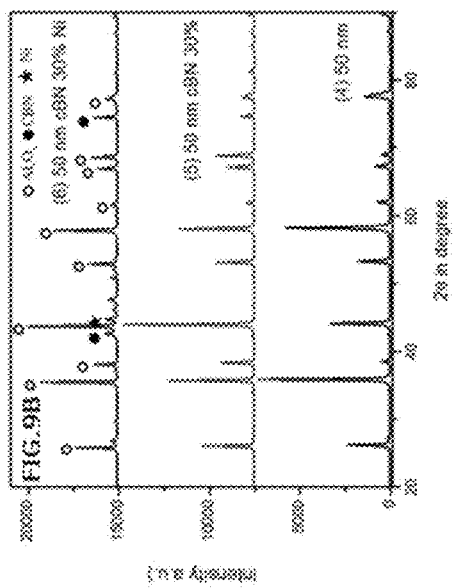
FIGS. 9A, 9B and 9C show effects of varying size of alumina particles and of using uncoated or nickel coated cBN.
Figure 9B:
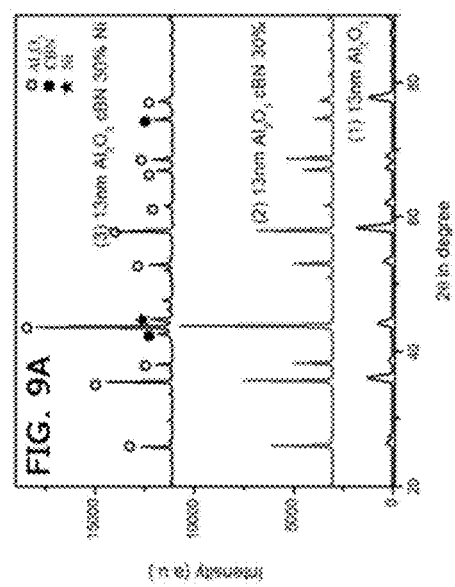
Figure 9C:
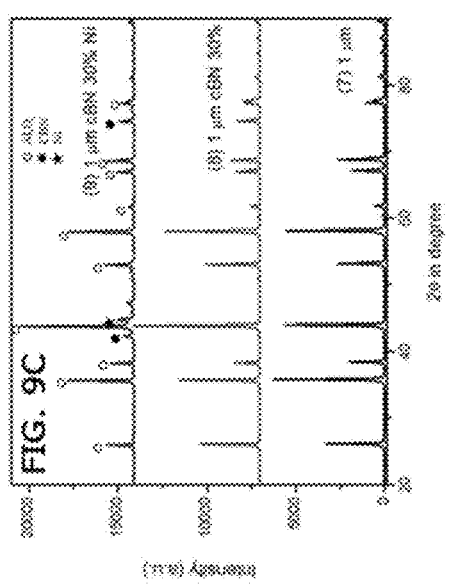

The XRD patterns of the said sample are represented in FIGS. 9A, 9B and 9C. All the diffraction pattern suggest that the smaller size of starting alumina (13 nm, 50 nm, or 1 um) restricted the cBN to hBN transformation. The amount of cBN to hBN transformation for all the particle sizes was negligible. The specific percentages of cBN and hBN in the aforementioned composites are tabulated in Table 4. In Raman observation in FIG. 10.

TABLE 3

Classification of synthesized materials based on starting size of matrix powder, type and amount of cBN reinforcement.

| S/No | Sample ID | Matrix | Matrix Size | cBN wt. % | CBN Ni-coated |
|---|---|---|---|---|---|
| 1 | 13 nm $Al_2O_3$ | Alumina | 13 nm | 30 | — |
| 2 | 13 nm $Al_2O_3$-cBN 30% | Alumina | 13 nm | 30 | No |
| 3 | 13 nm $Al_2O_3$-cBN 30% Ni | Alumina | 13 nm | 30 | Yes |
| 4 | 50 nm $Al_2O_3$ | Alumina | 50 nm | 30 | — |
| 5 | 50 nm $Al_2O_3$-cBN 30% | Alumina | 50 nm | 30 | No |
| 6 | 50 nm $Al_2O_3$-cBN 30% Ni | Alumina | 50 nm | 30 | Yes |
| 7 | 1 um $Al_2O_3$ | Alumina | 1 um | 30 | — |
| 8 | 1 um $Al_2O_3$-cBN 30% | Alumina | 1 um | 30 | No |
| 9 | 1 um $Al_2O_3$-cBN 30% Ni | Alumina | 1 um | 30 | Yes |

TABLE 4

Amount of untransformed cBN (40 μm, with and without Ni coating) and negligible transformed hBN in different sizes of alumina matrixes described by Table 3.

| S/No | Sample ID | cBN % | hBN % |
|---|---|---|---|
| 2 | 13 nm $Al_2O_3$-cBN 30% | 99.00 | 1 |
| 3 | 13 nm $Al_2O_3$-cBN 30% Ni | 100.0 | 0.00 |
| 5 | 50 nm $Al_2O_3$-cBN 30% | 99.0 | 1 |
| 6 | 50 nm $Al_2O_3$-cBN 30% Ni | 100 | 0 |
| 8 | 1 um $Al_2O_3$-cBN 30% | 99.30 | 0.70 |
| 9 | 1 um $Al_2O_3$-cBN 30% Ni | 99.82 | 0.18 |

As apparent from Table 4, the spark plasma sintering of nickel-coated cBN and nano-sized alumina particles produced no hCN, while hBN was produced when cBN particles were sintered with either nano-sized in the absence of Ni-coated cBN particles, or when uncoated or nickel-coated cBN particles were sintered with micro-sized alumina.

Figure 10:
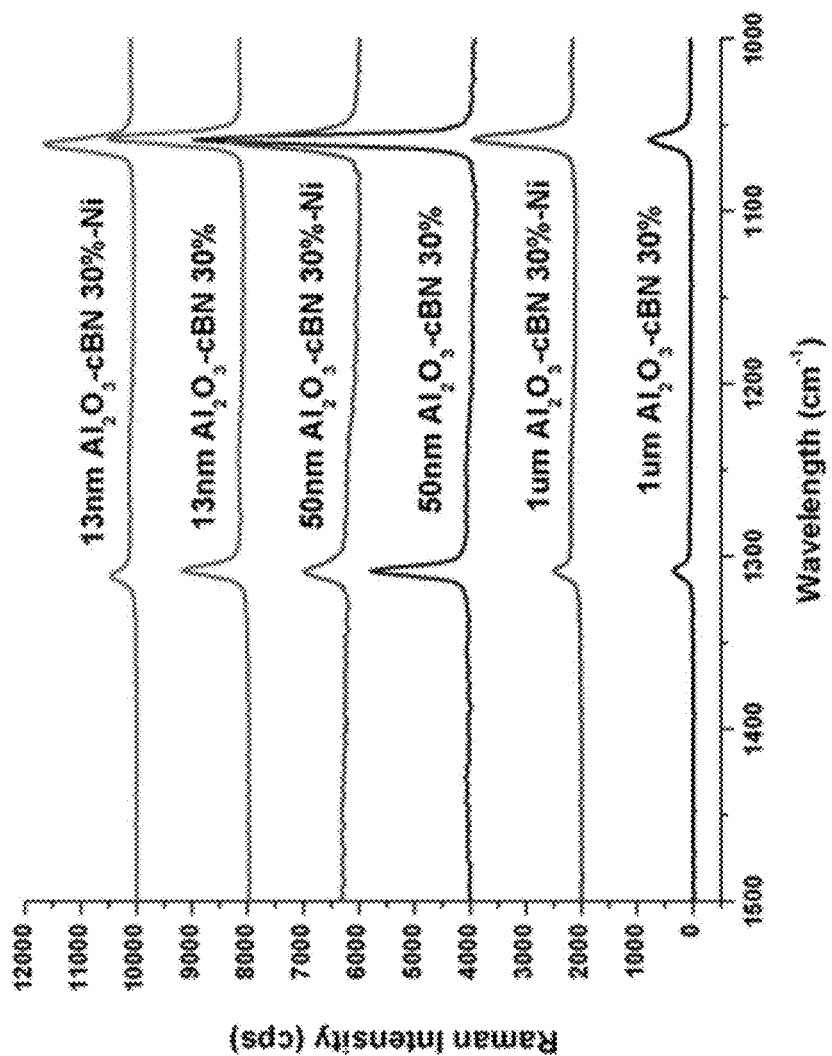
FIG. 10. Raman Spectrum of alumina reinforced with 30 wt. % of cBN (fixed 40 μm) particles, with and without nickel coating, 13 nm alumina matrix (two top plots), 50 nm alumina matrix (two mid plots), and 1 um alumina matrix (two bottom plots).

As shown in FIG. 10, Raman spectroscopy, which provides a fingerprint of cBN content based on cBN-characteristic peaks at 1,056 $cm^{-1}$ and 1,307 $cm^{-1}$, all samples contained cBN. These results show that alumina matrices inhibited transformation of cBN into hBN.

Example 5

To test the effects of variation of cBN particle size alumina composites were SPS sintered from 150 nm alumina and 30 wt. % cBN. The particle size of cBN was varied between 5, 10, 20, 40, and 60 μm. Initial results showed that a negligible amount of cBN transformed into hBN in the matrix of 150 nm sized alumina particles and that a similar trend to that shown by Table 1 was observed. Some phase transformation occurred in composites made with cBN particles of 40 μm and above. While preliminary, these data suggest that better control over phase transformation may be attained by further selecting a cBN particle size that minimizes phase transformation of cBN to hBN.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by insertion of a space or underlined space into a link, for example, before "www" or after "//" and may be reactivated by removal of the space.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it is also envisioned that Parameter X may have other ranges of values including 1-9, 2-9, 3-8, 1-8, 1-3, 1-2, 2-10, 2.5-7.8, 2-8, 2-3, 3-10, and 3-9, as mere examples.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology. As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears. The description of raw materials for SPS of alumina, cBN or nickel-coated cBN or other sintering materials, SPS conditions, and standards for measuring physical or chemical properties of sintered alumina-cBN or sintered alumina-nickel-cBN ceramics are specifically incorporated by reference to the documents cited herein.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A method for making an alumina-cubic boron nitride ("$Al_2O_3$-cBN") composite comprising:
   forming a mixture of cBN particles and nano-sized alumina particles;
   consolidating the mixture;
   spark plasma sintering the mixture of the cBN particles and the nano-sized alumina particles at constant pressure to form the alumina-cubic boron nitride composite;
   wherein an average particle size of the nano-sized alumina particles is no more than 50 nm.

2. The method of claim 1, wherein the cBN particles are substantially cBN without a nickel coating.

3. The method of claim 1, wherein the cBN particles are coated with nickel.

4. The method of claim 1, wherein the cBN particles are coated with nickel and comprise 20-80 wt % nickel, based on a total weight of the nickel-coated cBN particles.

5. The method of claim 1, wherein the cBN particles are coated with nickel and comprise 50-70 wt % nickel, based on a total weight of the nickel-coated cBN particles.

6. The method of claim 1, wherein an average particle size of the nano-sized alumina particles is no more than 25 nm.

7. The method of claim 1, wherein an average particle size of the nano-sized alumina particles is no more than 10 nm.

8. The method of claim 1, wherein an average particle size of the nano-sized alumina particles is no more than 5 nm.

9. The method of claim 1, wherein an average particle size of the nano-sized alumina particles is no more than 2 nm.

10. The method of claim 1, wherein an average particle size of the cBN particles ranges from 1 to 100 μm.

11. The method of claim 1, wherein an average particle size of the cBN particles ranges from 5 to 50 μm.

12. The method of claim 1 that produces an alumina-cubic boron nitride ($Al_2O_3$-cBN) or alumina-cubic boron nitride/nickel ($Al_2O_3$-cBN/Ni) composite having a higher Vickers hardness than an otherwise identical composite that was not spark plasma sintered at 1,200-1,600° C.

13. The method of claim 1 that produces an alumina-cubic boron nitride ($Al_2O_3$-cBN) or alumina-cubic boron nitride/nickel ($Al_2O_3$-cBN/Ni) composite having a higher Vickers hardness than an otherwise identical composite sintered from alumina particles having an average particle size of 1,000 nm.

14. The method of claim 1 that produces an alumina-cubic boron nitride ($Al_2O_3$-cBN) or alumina-cubic boron nitride/nickel ($Al_2O_3$-cBN/Ni) composite having a higher Vickers hardness than an otherwise identical composite sintered from cBN particles that are not coated with nickel, wherein the spark plasma sintering is performed at a temperature above 1,350° C. and wherein at least 99 wt. % of the boron nitride in the composite is cBN or less than 1 wt. % of the boron nitride is hBN.

* * * * *